US010942197B2

(12) United States Patent
Wiseman

(10) Patent No.: US 10,942,197 B2
(45) Date of Patent: Mar. 9, 2021

(54) DIRECTIONAL DIFFERENTIAL PRESSURE DETECTOR

(71) Applicant: Brian M. Wiseman, Newbury, MA (US)

(72) Inventor: Brian M. Wiseman, Newbury, MA (US)

(*) Notice: Subject to any disclaimer, the term of this patent is extended or adjusted under 35 U.S.C. 154(b) by 39 days.

(21) Appl. No.: 16/222,944

(22) Filed: Dec. 17, 2018

(65) Prior Publication Data

US 2019/0154724 A1  May 23, 2019

Related U.S. Application Data

(63) Continuation of application No. 14/538,097, filed on Nov. 11, 2014, now Pat. No. 10,191,077, which is a continuation of application No. 14/210,607, filed on Mar. 14, 2014, now Pat. No. 8,910,516.

(60) Provisional application No. 61/791,703, filed on Mar. 15, 2013.

(51) Int. Cl.
*G01P 13/00* (2006.01)
*G01L 13/00* (2006.01)

(52) U.S. Cl.
CPC .......... *G01P 13/0066* (2013.01); *G01L 13/00* (2013.01); *G01P 13/0013* (2013.01)

(58) Field of Classification Search
CPC ... G01L 13/00; G01P 13/0013; G01P 13/0066
See application file for complete search history.

(56) References Cited

U.S. PATENT DOCUMENTS

| 2,497,255 A | 2/1950 | Brown |
| 2,542,442 A | 2/1951 | Weber |
| 3,397,319 A | 8/1968 | Locke |
| (Continued) | | |

FOREIGN PATENT DOCUMENTS

| FR | 2 428 845 A1 | 1/1980 |
| GB | 394 145 A1 | 6/1933 |
| WO | WO 98/52050 A1 | 11/1998 |

OTHER PUBLICATIONS

U.S. Appl. No. 15/356,396, filed Nov. 18, 2016, Wiseman.
(Continued)

*Primary Examiner* — Freddie Kirkland, III
(74) *Attorney, Agent, or Firm* — Wolf, Greenfield & Sacks, P.C.

(57) ABSTRACT

Methods and apparatuses for indicating the presence of a directional differential pressure between separated adjacent spaces are provided. A differential pressure set point indicator may be configured to correlate multiple potential angles of inclination of an elongated conduit to respective threshold differential pressures between two spaces which generate net flow of fluid sufficient to cause a lightweight ball to move from one region of the conduit to an opposing region. The elongated conduit may be adjustable in length so as to accommodate installation of the device into walls of varying thickness. The device may include a sound attenuator that reduces noise upon impact of the ball with either end of the conduit. The device may also include a sealing material that is flexible yet firm enough to provide both a seal with the exterior surface of the conduit and support for the conduit when oriented in a tilted configuration.

26 Claims, 26 Drawing Sheets

(56) References Cited

U.S. PATENT DOCUMENTS

| | | | |
|---|---|---|---|
| 3,815,542 A | 6/1974 | Cooper | |
| 3,930,568 A | 1/1976 | Levey | |
| 4,040,650 A | 8/1977 | Shotbolt | |
| 4,154,101 A * | 5/1979 | Buchanan | G01F 1/28 |
| | | | 73/272 R |
| 4,271,693 A | 6/1981 | Bute | |
| 4,486,744 A | 12/1984 | Pratt et al. | |
| 4,679,827 A | 7/1987 | Law | |
| 4,787,251 A | 11/1988 | Kolodiski | |
| 4,819,577 A | 4/1989 | Campau | |
| 5,195,376 A * | 3/1993 | Banks | G01L 19/12 |
| | | | 116/268 |
| 5,291,182 A | 3/1994 | Wiseman | |
| 5,343,753 A | 9/1994 | Boutin | |
| 5,410,298 A | 4/1995 | Wiseman | |
| 5,461,910 A | 10/1995 | Hodson | |
| 5,589,643 A * | 12/1996 | Pyle | G01F 1/28 |
| | | | 73/700 |
| 5,661,461 A | 8/1997 | Wiseman | |
| 5,787,919 A * | 8/1998 | Pyle | A62C 2/12 |
| | | | 137/79 |
| 5,798,697 A * | 8/1998 | Wiseman | G01P 13/0013 |
| | | | 116/112 |
| 5,981,877 A | 11/1999 | Sakata et al. | |
| 6,477,896 B1 * | 11/2002 | Nyberg | G01P 13/04 |
| | | | 73/252 |
| 6,506,974 B2 | 1/2003 | Nakata | |
| 6,569,219 B1 | 5/2003 | Connor et al. | |
| 7,891,311 B2 | 2/2011 | Logan et al. | |
| 8,003,014 B2 | 8/2011 | Breay et al. | |
| 8,910,516 B2 * | 12/2014 | Wiseman | G01P 13/0066 |
| | | | 73/170.01 |
| 9,395,260 B2 * | 7/2016 | Pyle | G01L 13/00 |
| 10,191,077 B2 * | 1/2019 | Wiseman | G01P 13/0066 |
| 10,571,482 B2 * | 2/2020 | Wiseman | G01P 13/0066 |
| 2009/0301213 A1 * | 12/2009 | Barmettler | G01L 7/082 |
| | | | 73/753 |
| 2011/0094294 A1 | 4/2011 | Townsend et al. | |
| 2014/0260594 A1 | 9/2014 | Wiseman | |
| 2015/0059464 A1 | 3/2015 | Wiseman | |
| 2017/0067929 A1 | 3/2017 | Wiseman | |
| 2018/0164174 A1 | 6/2018 | Wiseman | |
| 2019/0154724 A1 * | 5/2019 | Wiseman | G01P 13/0013 |
| 2020/0158749 A1 * | 5/2020 | Wiseman | G01L 13/02 |

OTHER PUBLICATIONS

U.S. Appl. No. 15/821,440, filed Nov. 22, 2017, Wiseman.
PCT/US2014/024139, dated Aug. 15, 2014, International Search Report and Written Opinion.
PCT/US2014/024139, dated Sep. 24, 2015, International Preliminary Report on Patentability.
EP14769683.5, dated Oct. 28, 2016, Extended European Search Report.
U.S. Appl. No. 16/426,974, filed May 30, 2019, Wiseman.
U.S. Appl. No. 16/427,083, filed May 30, 2019, Wiseman.
U.S. Appl. No. 16/427,153, filed May 30, 2019, Wiseman.
International Search Report and Written Opinion from International Application No. PCT/2014/024139 dated Aug. 15, 2014.
International Preliminary Report on Patentability for Application No. PCT/US2014/024139, dated Sep. 24, 2015.
Extended European Search Report for Application No. 14769683.5, dated Oct. 28, 2016.

* cited by examiner

DIRECTIONAL DIFFERENTIAL PRESSURE DETECTOR

CROSS-REFERENCE TO RELATED APPLICATIONS

This application is a continuation of and claims the benefit of U.S. patent application Ser. No. 14/538,097, filed Nov. 11, 2014, entitled "DIRECTIONAL DIFFERENTIAL PRESSURE DETECTOR", which is a continuation of and claims the benefit of U.S. patent application Ser. No. 14/210,607, now U.S. Pat. No. 8,910,516, filed Mar. 14, 2014, entitled "DIRECTIONAL DIFFERENTIAL PRESSURE DETECTOR", which claims the benefit of U.S. Provisional Application No. 61/791,703, filed Mar. 15, 2013, entitled "DIRECTIONAL DIFFERENTIAL PRESSURE DETECTOR", the contents of each of which are incorporated herein by reference in their entirety.

FIELD

Aspects of the present disclosure relate generally to methods and apparatuses for detecting the presence of a directional differential pressure.

DISCUSSION OF RELATED ART

Various applications within hospitals, laboratories, pharmaceutical facilities, clean room facilities, etc., often require a particular direction of air flow to be maintained, such as between neighboring rooms, compartments, corridors, ducts, or other spaces. The pressure of a room relative to adjacent space(s) will determine the net direction of air flow through an opening into or out of the room.

For example, a hospital operating room, containing a patient who is undergoing surgery, may be supplied with highly filtered air so as to achieve a positive pressure, i.e., so that more air flows out of the room than into the room, thereby preventing dirty or infectious air from entering the room and entering the patient's wound. This positive pressure is accomplished by supplying clean air to the operating room at a greater flow rate than the flow rate at which air is exhausted from the room. Such an arrangement, where the operating room has a comparatively higher pressure than its surroundings, prevents air which may contain bacteria or other undesirable airborne contaminants from entering the operating room from the surrounding space(s).

Or, if a hospital patient is infected with an airborne communicable pathogen such as tuberculosis, the room may be kept under a negative pressure, i.e., the rate at which potentially contaminated air is exhausted from the room is greater than the rate at which air is supplied to the room and from the immediate surroundings. Such a negative pressure arrangement, where the room is under a comparatively lower pressure than its immediate surroundings, prevents air, which may contain bacteria or other undesirable airborne contaminants, from exiting the room and escaping into surrounding space(s).

The net differential pressure between rooms will cause air to flow from one room to the other in the direction from a higher pressure to a lower pressure. Depending on the application, the desired degree of differential pressure to be maintained between rooms, compartments, corridors, etc. will vary. For example, it is likely that a room that contains a highly infectious or hazardous matter should be kept under a greater degree of negative pressure than a room that contains a toxin that does not cause major concern.

Thus, it is often necessary for the general direction of air flow between compartments be closely monitored as well as the particular magnitude of differential pressure causing the net air flow. In addition, it may be desired to change the magnitude of differential pressure between rooms, for example, when the application of the room has changed.

SUMMARY

The inventor has appreciated that it would be beneficial to provide a simple detection system for fluid (e.g., air) flow that provides quantitative information regarding different degrees of differential pressure that may exist between adjacent spaces (e.g., enclosed rooms, compartments, corridors, etc.) and the associated causal direction of fluid flow between the spaces. As an example, the differential fluid (e.g., air) pressure between, e.g., two adjacent enclosed spaces A and B separated by a wall may be zero or more positive in space A than space B or more positive in space B than space A, causing a potential of air to flow between the spaces from zero or in the direction from space A to B or in the direction from space B to space A, respectively. The relative pressure between space A and B forms a differential pressure and depending on which space is of higher pressure, the relative pressure is directional in nature, i.e., causes a fluid to flow in a direction from a higher pressure region towards a lower pressure region and therefore a directional differential pressure exists.

Directional differential pressure detectors described herein may provide information that allows an observer to know immediately whether or not the room, as compared with its immediate surroundings, exhibits a particular direction of air flow, into or out of the room in response to a particular degree of negative or positive pressure difference, which may be required under set protocols for the room. Further, directional differential pressure detectors of the present disclosure may provide an observer not only with an indication that the direction of air flow from one space to another is in the desired direction, but also may inform the observer with the approximate magnitude of pressure difference between the spaces.

In some embodiments disclosed herein, a detection system is readily adjustable to account for changes in the use of the space. For example, when it is desired to change the direction of air flow and/or the differential pressure between spaces, differential pressure detectors discussed herein may be adjusted in a simple manner so as to provide an indication of whether the direction and magnitude of differential pressure between the spaces actually falls within the adjusted range.

A device for detecting a directional differential pressure between enclosed and neighboring spaces may include an elongated conduit that is arranged to extend through a wall connecting the spaces. The conduit may have openings at opposite ends that permit fluid (e.g., air) to flow between the otherwise enclosed spaces through the conduit in a direction that corresponds with the existing differential pressure between the spaces. A movable element (e.g., a lightweight ball) may be disposed within a lumen of the conduit so as to be affected by directional air flow generated by the pressure differential. That is, in response to the existing differential pressure between neighboring rooms, the resulting directional air flow may move the movable element from one region of the conduit to an opposite region (e.g., between two ends).

When the conduit is tilted at an angle with respect to a horizontal reference plane, one end of the conduit is positioned vertically lower than the opposite end. Absent net fluid flow through the conduit, the movable element falls by force of gravity to the lower end of the conduit. Though, given a sufficient amount of fluid flow through the conduit, from the lower end of the conduit towards the higher end (e.g., due to a net pressure differential), the force of gravity on the movable element may be overcome such that the movable element moves toward the higher end of the conduit.

The device may include a differential pressure set point indicator that responds to the angle of inclination of the conduit with respect to a horizontal plane. In particular, the differential pressure set point indicator may be configured and calibrated (e.g., based on a given size/weight of the movable element, parameters of the conduit, size of the openings at each end of the conduit) to correlate the angle of inclination of the conduit to a threshold differential pressure between the two spaces that is sufficient to cause the movable element within the conduit to move from one region (e.g., at a vertically lower position) of the conduit towards an opposite region (e.g., at a vertically higher position). For example, the greater the degree of tilt of the conduit, the greater the differential pressure required to generate sufficient fluid flow in the conduit to move the movable element from a lower region towards a higher region.

In some embodiments, the elongated conduit is adjustable in length. For example, the conduit may have two separate telescoping components that are slidable with respect to one another. Such adjustability in length may accommodate installation of the device into walls of varying thicknesses.

The movable element within the conduit may be contained by a stop near each of the ends of the open ended conduit. When the movable element impacts either of the stops of the conduit, in some cases, a noticeable sound may be heard, largely depending on the relative compositions of the movable element and the stop(s) of the conduit. For instance, with the conduit installed at an incline from the horizontal, when the differential pressure between spaces becomes equal (e.g., the door between the room and an outside corridor is opened resulting in pressure equalization), the movable element may drop down from a higher vertical position back to a lower vertical position within the conduit, and the impact of the movable element with a lower end stop of the conduit may produce a sound. Such a sound may be irritating to those in close proximity to the lower end of the conduit, particularly if repeated frequently. For example, hospital inpatients in an infectious isolation room or laboratory mice in a vivarium, may be awakened during their sleep cycle each time the staff enters and exits the room. Accordingly, the device may include a sound attenuator that is adapted to reduce noise upon impact of the movable element from one region of the conduit to an opposing region. In some embodiments, the sound attenuator may be a relatively soft energy absorbing material or include an energy absorbing geometry provided as part of an end stop.

The device may further include a sealing material (e.g., gasket) placed in contact with the exterior surface of the conduit so as to provide a seal between the surface of the wall and the conduit when the device is installed. Accordingly, transfer of potentially contaminated air between a space and the interior cavity of a hollow wall may be substantially prevented. As the conduit may be positioned at a particular angle of inclination when installed, the sealing material may be flexible to provide and maintain a seal as well as accommodate appropriate adjustment(s) in position of the conduit (e.g., from one angle of incline to another). Yet, the sealing material may also be firm enough to provide a suitable amount of support for the tilted conduit (e.g., to maintain the position/orientation of the conduit).

In an embodiment, a device for detecting a directional differential pressure between two spaces is provided. The device includes an elongated conduit arranged to extend through a wall separating a first space from a second space, the conduit having openings at opposite ends that permit fluid flow through the conduit from the first space to the second space, the conduit arranged to be inclined with respect to a horizontal reference plane such that a first region of the conduit associated with the first space is vertically lower than a second, vertically higher region of the conduit that is associated with the second space; a movable element disposed within the conduit adapted to be moved from the first, vertically lower region of the conduit to the second, higher region or from the second higher region to the first vertically lower region, in response to a differential pressure between the first and second spaces; and a differential pressure set point indicator configured to correlate each of a plurality of angles of inclination of the conduit with respect to the horizontal reference plane to a respective threshold differential pressure between the first and second spaces that is sufficient to cause the movable element to move from the first, lower region of the conduit to the second, higher region.

In another embodiment, a device for detecting a directional differential pressure between two rooms is provided. The device includes an elongated conduit arranged to extend through a wall separating the two spaces, the conduit having openings at opposite ends that permit fluid flow between the two spaces through the conduit, the conduit being adjustable in length; and a movable element disposed within the conduit adapted to be moved from one region of the conduit toward an opposing region in response to the differential pressure.

In yet another embodiment, a device for detecting a directional differential pressure between two rooms is provided. The device includes an elongated conduit arranged to extend through a wall separating the two spaces, the conduit having openings at opposite ends that permit fluid flow between the two spaces through the conduit; a movable element disposed within the conduit adapted to be moved from one region of the conduit toward an opposing region in response to the differential pressure; and a sound attenuator adapted to reduce noise upon the movable element reaching one of the two conduit ends.

In another embodiment, a device for detecting a directional differential pressure between two rooms is provided. The device includes an elongated conduit arranged to extend through a wall separating the two spaces, the conduit having openings at opposite ends that permit fluid flow between the two spaces through the conduit; a sealing material in contact with an exterior surface of the conduit and adapted to support the conduit in an installed orientation; and a movable element disposed within the conduit adapted to be moved from one region of the conduit toward an opposing region in response to the differential pressure.

In yet another embodiment, a method of installing a device for detecting a directional differential pressure between two spaces is provided. The method includes positioning an elongated conduit to extend through a wall separating a first space from a second space, the conduit having openings at opposite ends that permit fluid flow through the conduit from the first space to the second space, the conduit arranged to be inclined with respect to a horizontal reference plane such that a first region of the conduit associated with the first space is vertically lower than a second, vertically higher region of the conduit that is associated with the second space, wherein a movable element disposed within the conduit is adapted to be moved from the first, vertically lower region of the conduit to the second, higher region in response to a differential pressure between the first and second spaces; referring to a differential pressure set point indicator to determine a first angle of inclination of the conduit with respect to a horizontal reference plane that corresponds to a first threshold differential pressure between the first and second spaces that is sufficient to cause the movable element to move from the first, lower region of the conduit to the second, higher region; tilting the conduit to achieve the determined first angle of inclination of the conduit with respect to the horizontal reference plane that corresponds to the first threshold differential pressure; referring to the differential pressure set point indicator to determine a second angle of inclination of the conduit with respect to the horizontal reference plane that corresponds to a second threshold differential pressure between the first and second spaces, different from the first threshold differential pressure, that is sufficient to cause the movable element to move from the first, lower region of the conduit to the second, higher region; and tilting the conduit to achieve the determined second angle of inclination of the conduit with respect to the horizontal reference plane that corresponds to the second threshold differential pressure.

Advantages, novel features, and objects of the invention will become apparent from the following detailed description of the invention when considered in conjunction with the accompanying drawings, which are schematic and which are not intended to be drawn to scale. For purposes of clarity, not every component is labeled in every figure, nor is every component of each embodiment of the invention shown where illustration is not necessary to allow those of ordinary skill in the art to understand the invention.

BRIEF DESCRIPTION OF THE DRAWINGS

The accompanying drawings are not intended to be drawn to scale. In the drawings, each identical or nearly identical component that is illustrated in various figures is represented by a like numeral. Various embodiments of the invention will now be described, by way of example, with reference to the accompanying drawings. The embodiments and drawings shown are not intended to narrowly define the invention.

DETAILED DESCRIPTION

Figure 1:
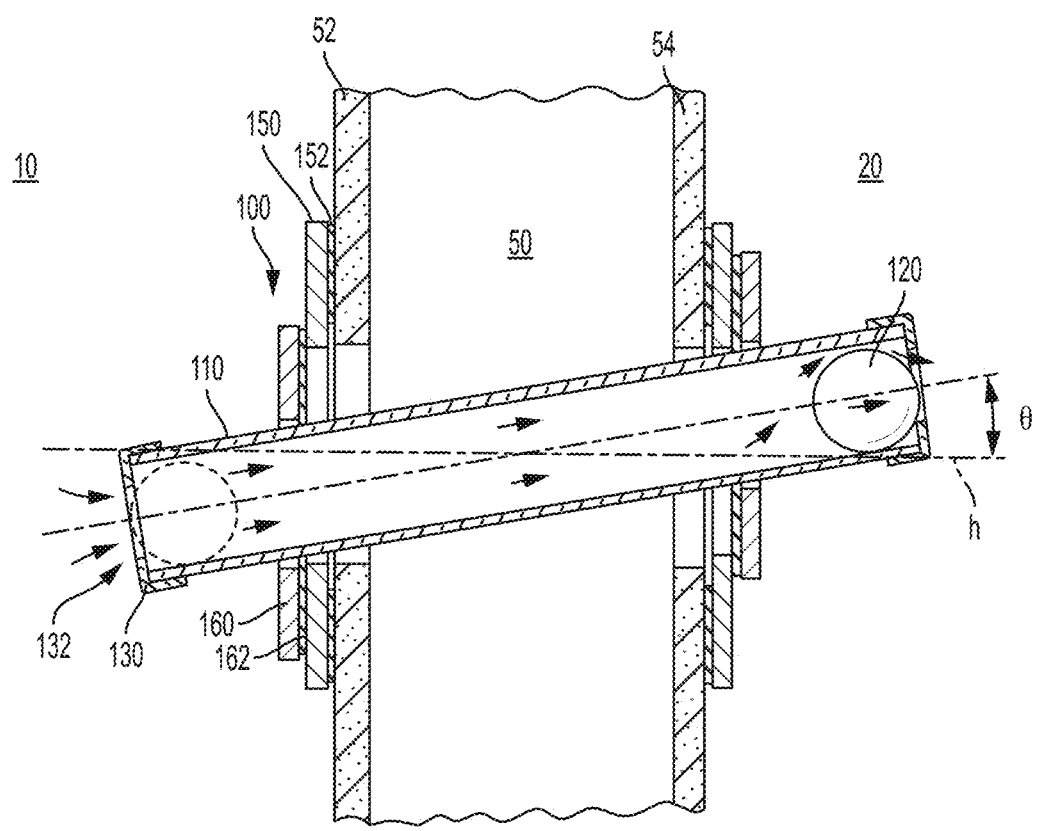
FIG. 1 is a cross-sectional view of a device subject to a differential pressure in accordance with some embodiments.

The present disclosure relates to a device that provides an indication of directional air flow and whether a particular degree of directional differential pressure exists between spaces separated by a wall (e.g., two neighboring rooms). In some embodiments, the device includes an elongated conduit with openings on opposite ends. A ball, or other movable element, is disposed within a lumen of the conduit and may move freely back and forth along the length of the conduit. Restraints or end stops located at opposite ends of the conduit may be used to contain the ball within the conduit so that the ball does not exit from the conduit. The end stops may have openings that allow fluid (e.g., air, inert gas, liquid) to flow through the lumen of the conduit from one end to an opposite end.

The device may include a differential pressure set point indicator associated with the conduit and a movable element within the lumen of the conduit. The set point indicator may be configured to correlate the incline of the conduit with respect to the horizontal plane to a respective threshold directional differential pressure between the two adjacent spaces sufficient to cause the movable element to move from a lower region of the inclined conduit to a higher region. The directional differential pressure set point indicator may include, for example, a bubble vial, a rotating weighted pendulum pointer, or other components that respond to the incline of the conduit and correlate to a directional differential pressure set point. The differential pressure set point indicator may be appropriately calibrated such that the markings on the differential pressure set point indicator correspond to specific minimum values of directional positive and/or negative differential pressure that may exist between spaces separated by a wall (e.g., at ends of the conduit). Accordingly, the differential pressure set point indicator may provide an indication of what angle of conduit inclination corresponds to the directional threshold differential pressure set point between the two separated spaces that results in movement of the ball from a lower region of the conduit towards an opposing, higher region of the conduit.

In some embodiments, when installed, the conduit extends from one side of a wall to the other side such that opposite ends of the conduit extend outwardly into neighboring spaces that are separated by the wall. In some embodiments, only one end of the conduit extends outwardly from the wall. Air is permitted to flow between the spaces through the conduit, from one end of the conduit to the opposite end. When the conduit is inclined, and there is little to no net differential pressure between the spaces to which opposite ends of the conduit extend, the force of gravity acting on the ball causes the ball to move toward or remain at the lower end of the conduit.

In practice, the incline of the conduit is such that the lower end of the conduit is placed in the room desired to be of a higher pressure relative to the adjacent communicating room via the conduit where the higher end of the conduit resides. In this arrangement, the desired direction of air flow caused by this pressure differential will be from the higher pressure room with the low end of the conduit towards the lower pressure room with the higher end of the conduit.

Depending upon the physical features of the conduit (e.g., lumen diameter, straightness/curvature, surface finish), physical features of the ball (e.g., diameter, weight, surface finish), degree of incline of the conduit, fluid properties of the media between compartments, orifice size at the end stops, and the directional differential pressure between compartments, the equilibrium position of the ball may be on either end of the conduit such that the ball can be seen from the appropriate space. Though, in some cases, depending at least in part on how the incline of the conduit is set relative to the existing differential pressure between spaces, the ball may remain stationary at an intermediate location with respect to the ends of the conduit.

As an example, for a hospital isolation room occupied by a patient with an infectious disease that is capable of airborne transmission, it may be desirable to keep the room at a negative differential pressure relative to one or more adjacent rooms, so as to substantially prevent airborne transmission of the disease to an adjacent room. In such an arrangement, the room exhausts more air than is supplied within it and from the surroundings, to an extent that the negative pressure is of a greater magnitude than any adjacent space. Thus, the conduit should be installed such that the end of the conduit that extends inside the isolation room is at a higher position than the opposite end of the conduit that extends into a space immediately exterior to the isolation room (e.g., a corridor, a compartment, duct, or another room).

When the net differential pressure between the isolation room and the outside space is zero (e.g., a door between the room and the outside space is opened), the ball will fall to the lower end of the conduit such that an observer inside the isolation room would not be able to view the ball; it follows that an observer outside the isolation room would be able to see the ball. When the appropriate degree of negative pressure is applied to the room, the ball moves upwardly within the conduit through the wall and into the isolation room. That is, the difference between the pressure of the isolation room and the pressure in the outside space on the opposite side of the wall causes an air flow rate through the conduit that is sufficient to move the ball upwardly where it can be viewed from inside the isolation room—thereby indicating that at least the appropriate direction of air flow and degree of negative pressure is applied to the room.

In the case of a room that is required to exhibit a positive pressure, so as to substantially prevent air to flow from a surrounding region into a room, the net flow of air is from the room itself to the immediate surroundings. Accordingly, the conduit is installed such that the end of the conduit that extends inside the room is at a lower position than the opposite end of the conduit that extends into the surrounding space exterior to the room. Thus, when a suitable amount of positive pressure is applied to the room, there is sufficient directional air flow through the conduit to move the ball upwardly within the conduit through the wall to the conduit end located in the surrounding space.

It may be necessary to adjust the device for different minimum differential pressures that give rise to respective directions of air flow between the spaces. For example, it may be desired that a room containing cyanide be at a higher negative differential pressure as compared to a wood processing plant room containing airborne sawdust. If it is desired that the magnitude of the negative pressure difference between a room and the outside space be increased, the conduit may be adjusted to be inclined at a greater angle relative to a horizontal reference plane. Devices described herein may allow for simple adjustment of the angle of the conduit relative to a horizontal reference plane, so as to provide a clear indication as to whether the newly desired net differential pressure exists to cause a desired direction of air flow between the separate spaces.

When installed, the conduit may be set at an appropriate angle of inclination that corresponds to the desired threshold differential pressure set point to cause a desired direction of air flow between separate spaces. In some embodiments, the desired differential pressure between separate spaces to which the device may provide an indication of the appropriate degree of incline may be between 0.001 inch of $H_2O$ and 10 inches of $H_2O$ (e.g., between 0.001 inch of $H_2O$ and 1 inch of $H_2O$, between 0.001 inch of $H_2O$ and 5 inch of $H_2O$, between 0.005 inches of $H_2O$ and 0.5 inches of $H_2O$, between 0.1 inch of $H_2O$ and 0.5 inches of $H_2O$, between 0.01 inch of $H_2O$ and 0.1 inches of $H_2O$, between 0.01 inch of $H_2O$ and 0.05 inches of $H_2O$, between 0.01 inch of $H_2O$ and 0.03 inches of $H_2O$, between 0.005 inches of $H_2O$ and 0.1 inch of $H_2O$, between 0.001 inch of $H_2O$ and 0.005 inches of $H_2O$, between 0.001 inch of $H_2O$ and 0.003 inches of $H_2O$, etc.), as measured by a standard water column barometer. It can be appreciated that devices of the present disclosure may provide an indication of other differential pressures between adjacent spaces outside of these ranges.

As discussed, a differential pressure set point indicator may be appropriately secured to the conduit so as to provide a correlation between the angle of inclination of the conduit with respect to a horizontal reference plane that corresponds to the threshold differential pressure between spaces that is required to generate sufficient directional air flow through the conduit to move the ball from an end at a lower position to the opposite end at a higher position.

As an example, if the desired differential pressure leading to air flow in a particular direction between compartments separated by a wall is 0.02 inches of $H_2O$, then, given the components of the system (e.g., ball, conduit, orifices), the conduit may be angled in such a manner that the force of gravity on the ball will be overcome by the directional air flow created by at least 0.02 inches of $H_2O$ pressure difference between the compartments. Thus, if the angle of inclination of the conduit is set for a differential pressure of 0.02 inches of $H_2O$ between compartments, and the differential pressure between the compartments is actually 0.01 inches of $H_2O$, then the amount of directional air flow generated by the only 0.01 inches of $H_2O$ differential pressure in the direction from the lower end to the upper end of the conduit will be insufficient to overcome the force of gravity on the ball, due to the angle of incline of the conduit being too high (conduit is too steep). The same holds if the direction of air flow within the conduit is from the higher end towards the lower end.

As a result, the ball will remain at the lower end of the conduit because the directional threshold differential pressure in the direction of air flow from the lower end to the higher end has not been met. However, if the angle of inclination of the conduit is adjusted to be less (conduit is less steep) so as to correspond to a lower, 0.01 inch of $H_2O$ differential pressure in the desired direction of air flow between compartments, from the lower end towards the higher end of the conduit, then the amount of directional air flow generated between rooms will be sufficient to overcome gravity and move the ball from the lower end to the higher end of the conduit.

FIG. 1 depicts a device 100 for detecting whether a directional differential pressure is present between two spaces separated by a wall 50. The device 100 includes a conduit 110 (e.g., tube) which has openings at opposite ends.

The conduit 110 extends from one surface 52 of a wall 50 to the opposite surface 54. In this embodiment, the surface 52 corresponds to a first room 10 and the surface 54 corresponds to a second room 20 on the opposite side of the wall. The conduit 110 extends between neighboring rooms 10, 20 at an angle θ with respect to a horizontal reference plane h.

A movable element, such as a ball 120 (e.g., a ping pong ball, other spherical ball) or other suitable article, is contained by end stops 130 (e.g., end caps) that allow fluid flow through the end stop within a lumen of the conduit. The ball 120 has an outer diameter that is less than the inner diameter of the conduit 110. In some embodiments, the ball is made of a lightweight material and moves freely along the length of the conduit 110 between opposite ends. Any other suitable movable element may be used, for example, a slidable block, a cylindrically shaped article, etc. In some embodiments, multiple movable elements may be used by the device simultaneously.

Each end of the conduit may be fitted securely with restraints or end stops 130. The end stops 130 have respective openings 132 through which fluid (e.g., air) may readily flow. The openings 132 have respective shapes and sizes that prevent the ball from falling out of the conduit when the ball moves toward and impacts the end stop 130. For example, the opening 132 may have a diameter that is smaller than the outer diameter of the ball 120, keeping the ball retained within the lumen of the conduit.

The end stops 130 may be suitably secured as caps at the ends of the conduit 110, for example, by a friction fit, snap fit, or otherwise. In some embodiments, the end stops 130 and the conduit 110 are transparent or translucent so that the ball 120, when present, can be readily seen by a person observing the device from either space 10, 20 on opposite sides of the wall 50 in which the device is installed. In some cases, the ball 120 is brightly colored so that the ball is easily noticeable to a person who is looking at the device.

The conduit 110 is attached to the wall by a series of wall flanges. In particular, FIG. 1 shows inner wall flanges 150 and outer wall flanges 160, along with inner sealing materials 152 and outer sealing materials 162. The flanges 150, 160 are appropriately positioned so as to accommodate the desired angle of inclination of the conduit. The conduit is held by the outer sealing materials 162 at the desired angle of inclination, described further below.

An inner sealing material 152 is disposed between an inner wall flange 150 and the surface 52. The inner wall flange 150 and inner sealing material 152 may be secured (e.g., attached, adhered, fastened) together to the wall surface 52. As such, the inner sealing material 152 may provide an appropriate seal, preventing unwanted air leakage between rooms 10, 20 via the wall cavity space, should such a cavity exist. Additionally, the inner wall flange 150 and inner sealing material 152 have respective openings that are large enough through which the conduit 110 may extend without contact.

Outer wall flange 160, in turn, is secured (e.g., attached, adhered, fastened) to the inner wall flange 150 with the outer sealing material 162 being disposed between the flanges 150, 160. The outer wall flange 160 and outer sealing material 162 have openings through which the conduit 110 may extend. The inner sealing material 162 provides an appropriate seal preventing unwanted air leakage between rooms 10, 20, or via a wall cavity space. However, in various embodiments, the opening of the outer sealing material 162 has a diameter that is less than the outer diameter of the conduit 110 so that an appropriate seal may be formed between the outer sealing material 162 and the conduit 110. Such an arrangement further allows the conduit 110 to be suitably supported and held in a steady position when installed at an angle.

The wall flanges 150, 160 and sealing materials 152, 162 may be attached to respective wall surfaces 52, 54 and to each other by any suitable method, for example, via an adhesive and/or fastener. The wall flanges 150, 160 and sealing materials 152, 162 may be adjustable in position so as to accommodate variations in the angle of inclination θ of the conduit. In some embodiments, the inner wall flange 150 is attached to the wall 50; however, the position of the outer wall flange 160 may be adjusted vertically with respect to the inner wall flange 150. Accordingly, the outer wall flanges 160 may be re-positioned to permit the angle of the conduit to be appropriately altered.

The device 100, when installed, may be used to detect whether a desired directional differential pressure exists between the separate rooms 10, 20. When the air pressure between the separate rooms 10, 20 is the same, there will be no net flow of fluid through the conduit from one room to the other. Therefore, if the conduit is held at an angle of inclination with respect to the horizontal, due to gravity, the ball will fall down toward the lower of the two end stops and rest against that stop.

However, when the air pressure between the rooms 10, 20 is not equal, there will be a net flow of fluid through the conduit from the room with a comparatively higher pressure toward the other room. In FIG. 1, the pressure within room 10 is higher than the pressure within room 20. Accordingly, air will flow in a direction from room 10 to room 20, as indicated by the arrows shown within the conduit. If the velocity of air flow from room 10 to room 20 meets a certain threshold, the air flow will overcome the force of gravity on the ball causing the ball to move from the lower end of the conduit within room 10 towards the higher end of the conduit within room 20. Thus, for the embodiment of FIG. 1, when the ball moves from room 10, through the wall and into room 20, the device has indicated that the differential pressure between room 10 and room 20 has met a certain direction of air flow and a corresponding threshold differential pressure causing the air flow through the conduit to travel in the direction from room 10 towards room 20.

Figure 2:
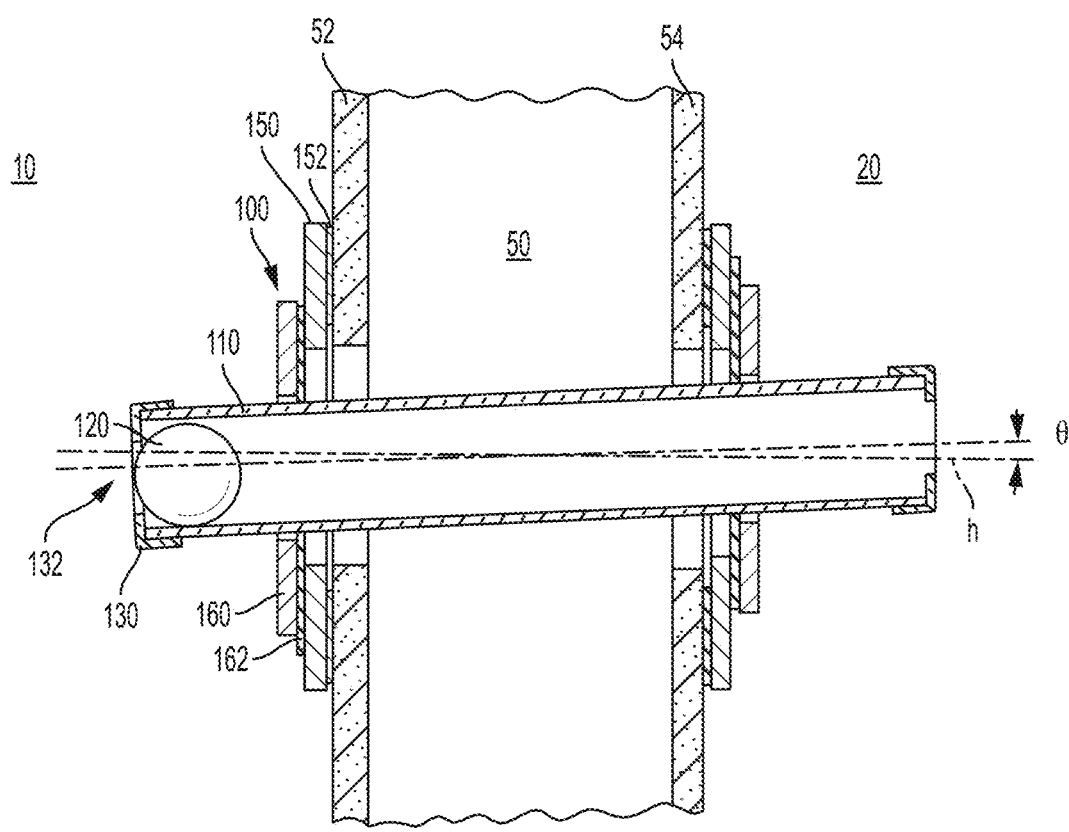
FIG. 2 is a cross-sectional view of the device of FIG. 1 at a different orientation.

In FIG. 2, there is no difference in pressure between the rooms 10, 20; hence, there is no net flow of air through the conduit. Accordingly, because the conduit remains at a slight angle of incline θ with respect to the horizontal h, the ball 120 rolls back to the lower end of the conduit, within room 10. In FIG. 1, the outer wall flange of room 10 is positioned substantially lower than the outer wall flange of room 20. Accordingly, the conduit 110 is oriented according to a relatively steep angle. Though, in FIG. 2, the outer wall flange of room 10 is positioned to be in much closer alignment, vertically, with respect to the outer wall flange of room 20. Such positioning permits the conduit 110 to be oriented according to a much smaller angle of incline.

Other arrangements are possible. For example, a device (not shown in the figures) may include an angled conduit where only one end extends outwardly from a wall, rather than two ends. Accordingly, depending on the differential pressure between spaces, the ball may move between a vertically higher region of the conduit and a vertically lower region of the conduit within the same room, or at least partially within a wall cavity.

In some embodiments, the device includes a differential pressure set point indicator that provides an indication (e.g., via a pointer referencing various markings) of a minimum differential pressure threshold that would cause the ball to move from a lower end region toward a higher opposite end region of the conduit. Markings of the differential pressure set point indicator may refer to actual units of pressure indicating the directional threshold pressure differential set point between rooms. Markings may include alphanumeric values to which a correlating table may be referred, to determine the corresponding directional threshold differential pressure set point. Or, in some embodiments, markings of the differential pressure set point indicator may provide the actual inclination angle θ of the conduit with respect to a horizontal reference plane h, also to which a correlating table may be referred, to determine the corresponding directional threshold differential pressure set point.

The differential pressure set point indicator may include a suitable pointer (e.g., an air bubble within a liquid, a ball within a fluid, a tip pointer, a pendulum, a pivotally arranged member, a weighted member, etc.) and associated markings that, when referred to by the indicator, provide information regarding the angle of inclination of the conduit and corresponding directional threshold differential pressure set point. The markings may be calibrated such that steady alignment of the indicator with a particular region of the markings, resulting in a particular angle of incline of the conduit, provides an indication to an observer of the threshold differential pressure required to cause the ball to move from a lower region to a higher region of the conduit.

It may be desirable for the device to provide assurance to an observer that the direction of air flow and the associated differential pressure between separate spaces meets certain requirements. For example, the differential pressure requirement in a particular direction between neighboring rooms may be approximately 0.01 inch of $H_2O$, and the differential pressure set point indicator may have markings that, given a particular angle of incline of the conduit, correspond to the different levels of differential pressure required to create sufficient air flow to cause the ball to move from a lower region (e.g., lower end) to a higher region (e.g., higher end) of the conduit. In this example, upon installation or adjustment of the device, the conduit may be set at a particular angle θ such that the pointer or bubble or ball of the differential pressure set point indicator comes into steady alignment with markings that correspond to a 0.01 inch of $H_2O$ pressure differential. Accordingly, when the actual differential pressure between rooms is approximately 0.01 inch of $H_2O$ or above, the directional air flow generated by the pressure difference will be sufficient to overcome the force of gravity on the ball so as to move the ball toward the higher end of the conduit.

When the differential pressure between rooms degrades (e.g., a door/window is opened between rooms or the ventilation system airflows degrade from proper settings), then the directional differential pressure between rooms may fall below approximately 0.01 inch of $H_2O$ in the direction from the lower end to the higher end of the conduit, and the ball falls back to the lower end of the conduit, indicating to an observer that the minimum directional differential pressure is not present. Or, when the directional differential pressure between the rooms degrades due to other factors such as changes in the ventilation system and falls below 0.01 inch of $H_2O$ in the direction from the lower end towards the higher end of the conduit, then the force of gravity overcomes the force provided by the net air flow through the conduit and the ball drops down to the lower end. In some embodiments, when the directional differential pressure between rooms inadvertently falls below the desired directional threshold pressure differential, an alarm may sound alerting the appropriate personnel that the direction of air flow or the directional threshold differential pressure requirements of the room are not met.

It may be desirable to have an adjustable range of differential pressure set points to accommodate different requirements between neighboring rooms, which may be accomplished by adjusting any of the associated characteristics of the elements of the detector, e.g., the ball diameter and weight, the conduit lumen diameter, the end stop orifices, the incline of the conduit. For example, there may be a desired directional air flow and associated threshold differential pressure of 0.05 inches of $H_2O$, from a previous setting of 0.01 inch of $H_2O$. As a result, given all other elements of the detector unchanged, the angle of incline of the conduit should be adjusted appropriately. If the conduit remains at the angle corresponding to a differential pressure of 0.01 inch of H₂O, then an actual directional pressure difference between rooms of, for example, 0.03 inches of H₂O in the same desired direction would give an observer an erroneous indication that the directional threshold differential pressure between the rooms is at least 0.05 inches of H₂O. That is, for this example, the air flow generated by a differential pressure of 0.03 inches of H₂O would cause the ball to move upward within the conduit, despite the desired directional threshold differential pressure of 0.05 inches of H₂O.

Accordingly, the angle of incline of the conduit may be re-positioned at a different angle such that the pointer of the directional threshold differential pressure set point indicator comes into steady alignment with markings that correspond to a 0.05 inches of H₂O directional threshold pressure differential. Thus, only when the actual directional differential pressure between rooms is 0.05 inches of H₂O or above, the air flow generated by the pressure difference will be sufficient to overcome the force of gravity on the ball so as to move the ball toward the higher end of the conduit. If and when the differential pressure requirement between neighboring rooms is to be changed yet again, then the angle of incline of the conduit may be further re-positioned to a different orientation that corresponds to the updated threshold differential pressure desired, according to the read out provided by the differential pressure set point indicator.

A number of different differential pressure set point indicators suitable for use with the device will now be presented.

Figure 3:
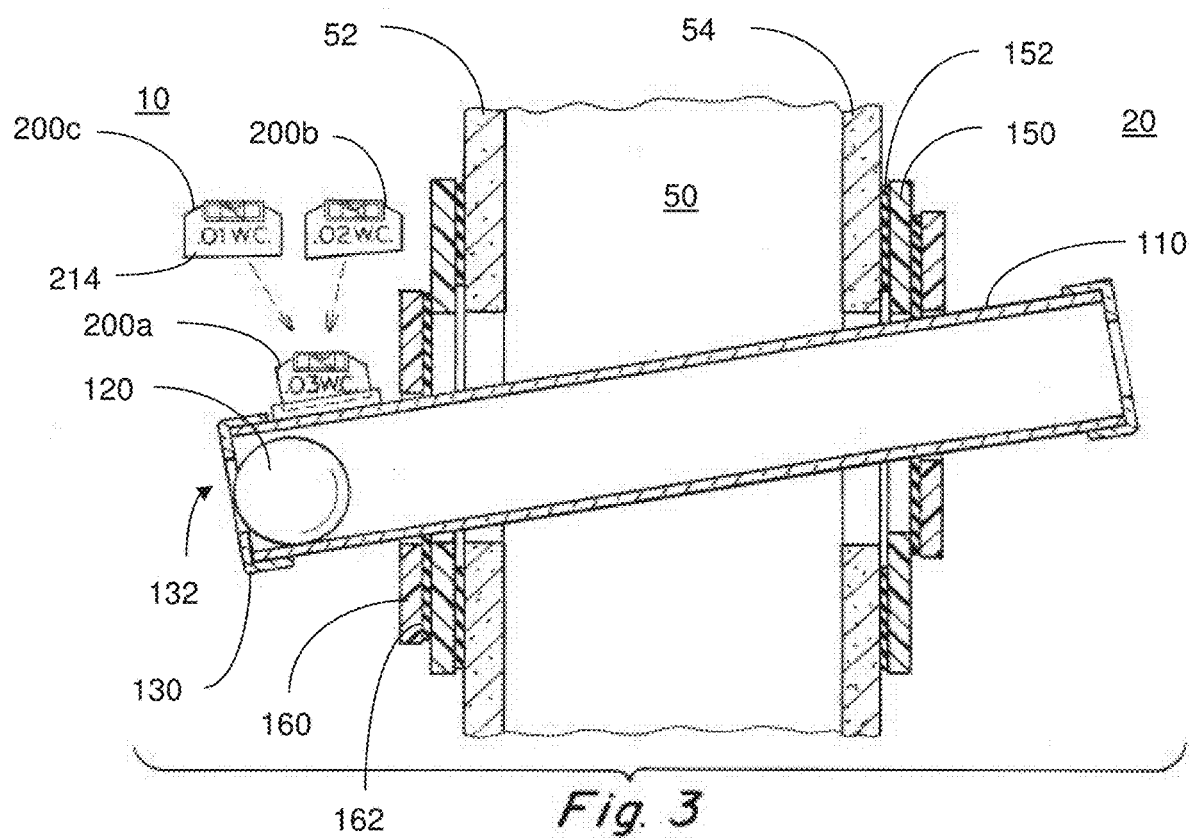
FIG. 3 is a cross-sectional view of a device for detecting a differential pressure in accordance with some embodiments.
Figure 4:
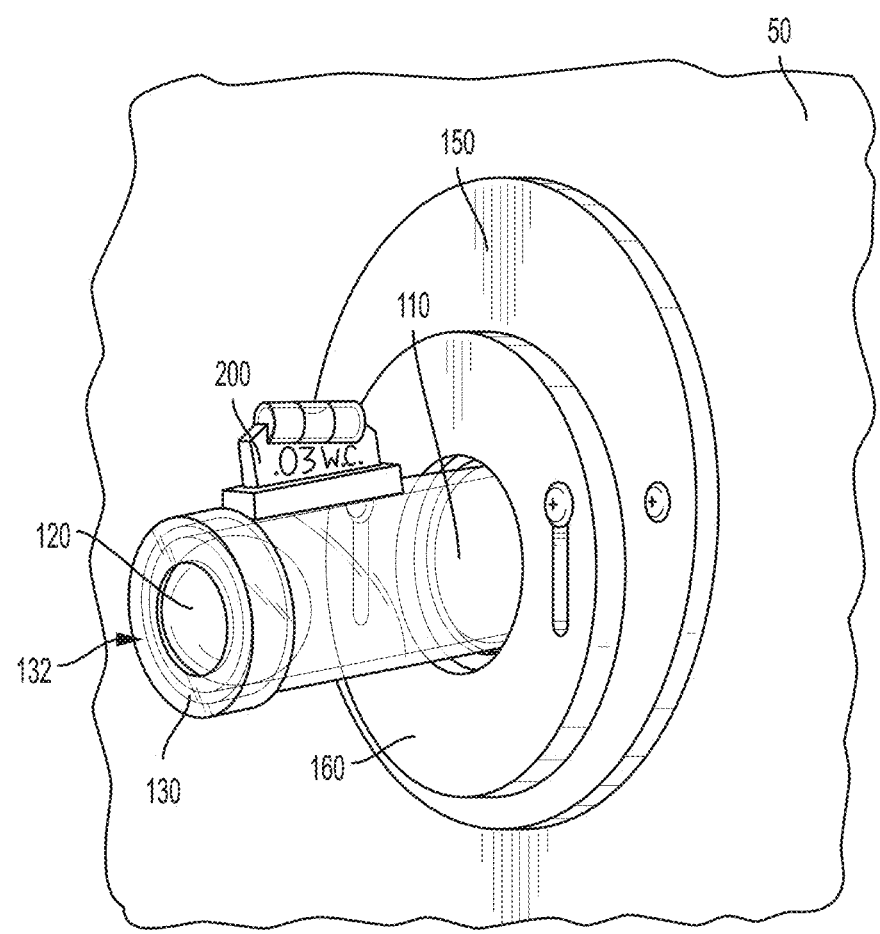
FIG. 4 is a partial perspective view of the device of FIG. 3.

FIGS. 3-4 show a device with an interchangeable bubble differential pressure set point indicator 200. Each bubble differential pressure set point indicator has a vial containing a liquid and an associated bubble. When the bubble reaches a steady equilibrium alignment between the lined markings on the vial, the differential pressure set point indicator is considered to be level with respect to the horizontal.

As shown, any one of a series of bubble differential pressure set point indicators 200a, 200b, 200c may be appropriately secured to the conduit. Each bubble differential pressure set point indicator 200 has a base plate 214 constructed for appropriate attachment to a surface of the conduit. The bottom surface of each base plate 214 is sloped so that when the respective differential pressure set point indicator is installed, the bubble will attain steady alignment between the lined markings when the conduit is set at a particular angle of incline. That is, the conduit will be positioned at an angle of incline that will allow the bubble of the differential pressure set point indicator to steadily remain within the middle of the vial between the lined markings. Such an angle of incline will correspond to the desired threshold differential pressure between separate spaces that would cause the ball to be displaced from the lower end toward the higher opposite end.

Referring to FIGS. 3-4, the currently installed differential pressure set point indicator 200a corresponds to a threshold differential pressure of 0.03 inches of H₂O. Accordingly, when the conduit is installed at the appropriate angle where the bubble of the differential pressure set point indicator 200a remains steadily at the middle of the vial, a directional differential pressure between rooms of 0.03 inches of H₂O or greater in the direction that causes the air to flow in the direction from the lower end to the higher end of the conduit and will generate enough air flow through the conduit to cause the ball to move from room 10 to room 20. Hence, if the directional differential pressure between rooms is less than 0.03 inches of H₂O in the direction from room 10 to 20 or the directional differential pressure goes to zero or reverses, then the air flow through the conduit will be insufficient to overcome the force of gravity on the ball. In such a case, the ball will remain at the lower end of the conduit.

The differential pressure set point indicator 200a may be appropriately replaced with either of differential pressure set point indicators 200b, 200c which, in this illustrative example, correspond to threshold pressure differentials of 0.02 inches of H₂O and a 0.1 inch of H₂O, respectively. Thus, if the device is fitted with differential pressure set point indicator 200b, when the conduit is installed at an angle such that the bubble pointer of the differential pressure set point indicator 200b remains steadily at the middle of the vial, a directional differential pressure between rooms of 0.02 inches of H₂O or greater in the direction from room 10 to 20 will cause the ball 120 to be moved from room 10 to room 20. And if the differential pressure between rooms is less than 0.02 inches of H₂O in the direction from room 10 to 20 or the directional differential pressure goes to zero or reverses, then the air flow through the conduit will be insufficient to overcome the force of gravity on the ball.

Figure 5:
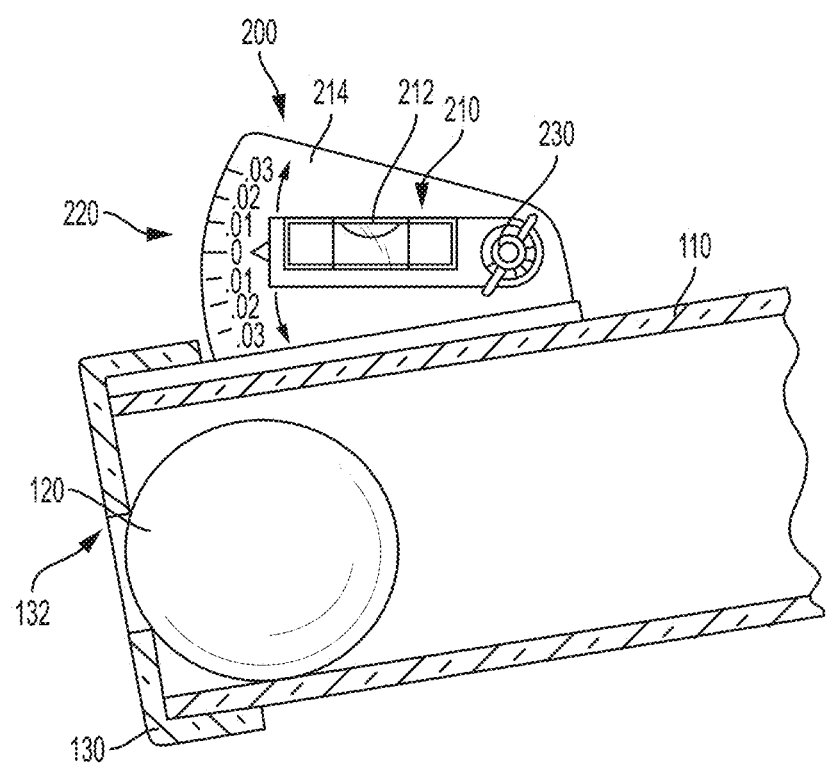
FIG. 5 is a partial cross-sectional view of another device for detecting a differential pressure in accordance with some embodiments.
Figure 6:
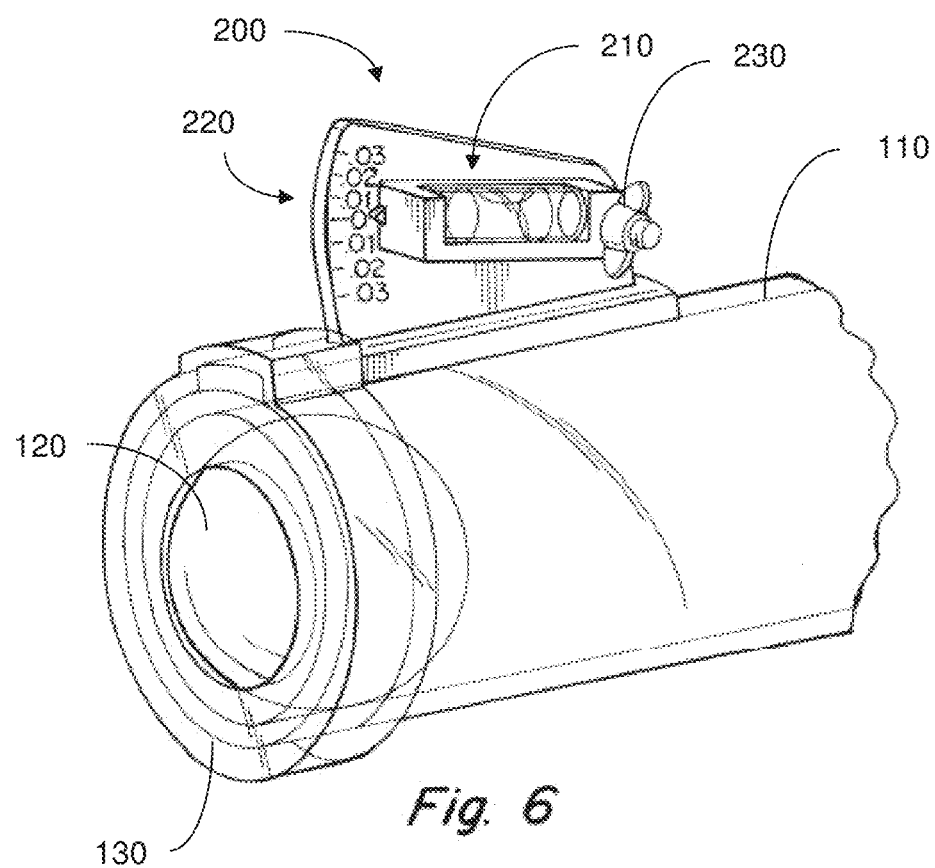
FIG. 6 is a partial perspective view of the device of FIG. 5.

As shown in FIG. 3, the indicator senses the degree of incline. The bottom surface of base plate 214 for attachment of differential pressure set point indicator 200a (corresponding to a threshold differential pressure of 0.03 inches of H₂O) to the conduit has a slope that is greater than that of differential pressure set point indicator 200b which, in turn, has a slope greater than that of differential pressure set point indicator 200c. Accordingly, for the differential pressure set point indicators of FIGS. 3-4, a greater desired threshold differential pressure will require a greater degree of slope of the conduit An embodiment of a device fitted with an adjustable bubble differential pressure set point indicator is shown in FIGS. 5-6. Like other bubble differential pressure set point indicators, this differential pressure set point indicator includes a vial 210 with a liquid and associated bubble pointer 212. The vial may be appropriately rotated about a pivot 230 with a fastener (e.g., wing nut), capable of loosening and securing rotation of the vial about the pivot so that the vial points to markings 220 that indicate corresponding threshold differential pressure values that may be set between separate spaces which, in turn, correspond to the appropriate angle of inclination of the differential pressure set point indicator 200 and, hence, the angle of the conduit 110 itself when the bubble pointer 212 is between the boundary lines 213. For instance, when it is desired for the device to be installed so as to extend through a wall and between rooms to indicate to an observer that a directional differential pressure of at least 0.02 inches of H₂O is present, then, in the embodiment of FIGS. 5-6, the angular position of the vial on the pivot 230 is adjusted so that the vial 210 points to the particular marking that references a pressure of 0.02 inches of H₂O in the desired direction of air flow. The desired direction of airflow is determined by placing the low end of the conduit in the room of desired higher pressure relative to the other room where the high end of the conduit resides. Since the differential pressure set point indicator can sense both directions of the conduit incline, there may be similar symmetric markings for the desired threshold differential pressure set point in each direction. Accordingly, the device is appropriately installed such that the pointer of the vial 210 aligns with the appropriate directional differential pressure markings resulting in the conduit having an angle of inclination that allows the bubble pointer 212 to remain steady at the middle of the vial between the boundary lines 213. Hence, after appropriate installation, a directional differential pressure in the direction from room 10 to room 20, of 0.02 inches of H$_2$O or greater will generate enough air flow through the conduit to cause the ball to move from room 10 (lower end) to room 20 (higher end).

If it is further desired that the device provide indication to an observer of whether a directional different differential pressure between rooms is present, then the pivot can be appropriately adjusted so that the vial points to the appropriate one of the two similar markings which correspond to the desired pressure, of which the appropriate mark of the two is determined by adjusting the conduit incline with the low end in the desired higher pressure room and the high end in the desired lower pressure room so that the bubble 212 reaches an equilibrium state in the middle of the vial e.g., between boundary lines 213.

For example, a change in the desired pressure difference between the spaces from 0.2 inches of H$_2$O to 0.03 inches of H$_2$O with the same desired direction of air flow may involve a simple adjustment of the wing nut so that the vial 210 points to the closer marking that references 0.03 inches of H$_2$O, which would involve positioning the conduit at a steeper angle of incline to put the bubble 212 in between the boundary lines 213. Once the differential pressure set point indicator is appropriately adjusted and the angle of inclination of the conduit is set within the wall such that the bubble pointer 212 remains steady at the middle of the vial, the device is now ready to provide an accurate indication of whether the desired direction of air and directional threshold differential pressure between rooms is actually present.

Figure 7:
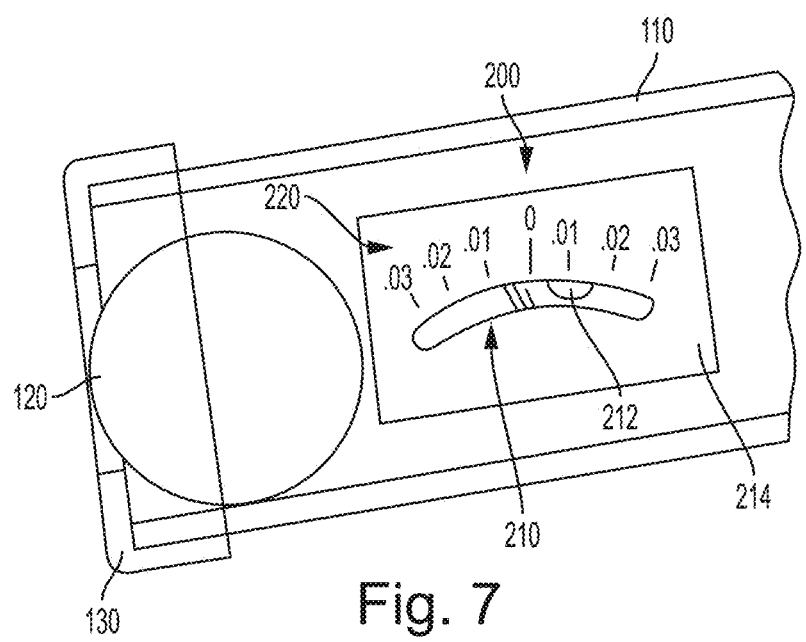
FIG. 7 is a partial cross-sectional view of a further device for detecting a differential pressure in accordance with some embodiments.

FIG. 7 shows a device that includes a bubble differential pressure set point indicator. In this embodiment, the differential pressure set point indicator 200 is attached to the conduit, via an appropriate base plate 214, and includes a vial 210 that contains liquid and an associated bubble pointer 212. Due to the geometry of the vial and gravity acting on the liquid within the vial, the bubble moves to the highest possible point within the vial. Here, the vial 210 exhibits a geometry (e.g., curvature) that allows for the bubble to provide differential pressure set point information at multiple regions along the vial. For instance, when the conduit is perfectly level, the bubble moves toward a position where the vial and base plate correlate to being level. However, when the conduit is tilted at an angle, the position of the bubble relative to the vial will change, so as to provide an indication that the conduit is set at a different angle of incline.

Accordingly, appropriate markings 220 are provided adjacent to the vial so that appropriate differential pressure set point information can be provided to an observer (e.g., someone who is adjusting the tilt of the conduit) when the conduit is angled in a manner that brings the bubble into steady alignment near particular marking(s). Since the differential pressure set point indicator can sense both directions of the conduit incline, there are two similar symmetric markings for each desired threshold differential pressure set point. Here, the markings 220 refer to the threshold differential pressure between rooms required to generate enough air flow through the conduit to move the ball from the lower end of the conduit to the higher end. That is, the conduit 110 may be tilted so that the bubble pointer 212 aligns with the appropriate one of the two similar markings which correspond to the desired pressure, of which the appropriate mark of the two is determined by adjusting the conduit incline with the low end in the desired higher pressure room and the high end in the desired lower pressure room so that the bubble 212 remains in steady alignment and pointing to the desired marking that indicates a particular value of directional pressure differential. When the conduit is installed at the angle that corresponds to that particular value of pressure differential, movement of the ball 120 to a higher region of the conduit may provide assurance to an observer that the directional differential pressure indicated by the bubble 212, at a minimum, actually exists between the separate spaces.

Figure 8:
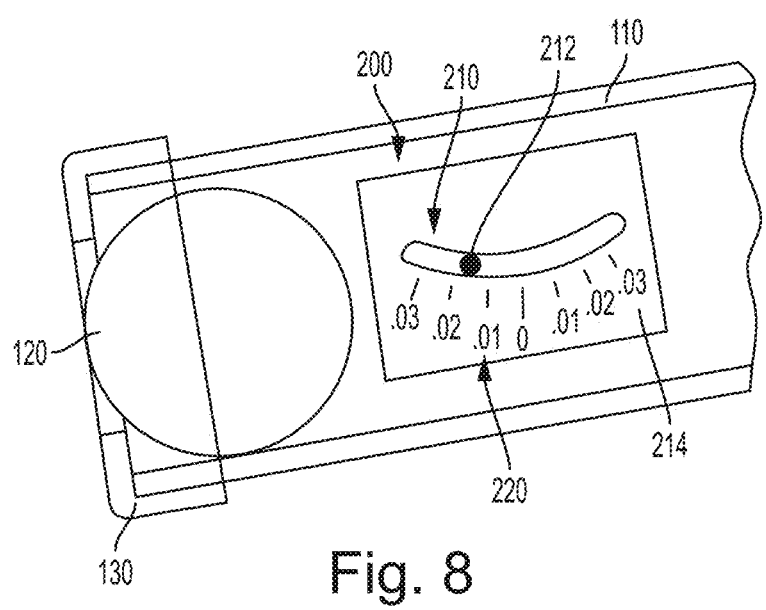
FIG. 8 is a partial cross-sectional view of yet another device for detecting a differential pressure in accordance with some embodiments.
Figure 9:
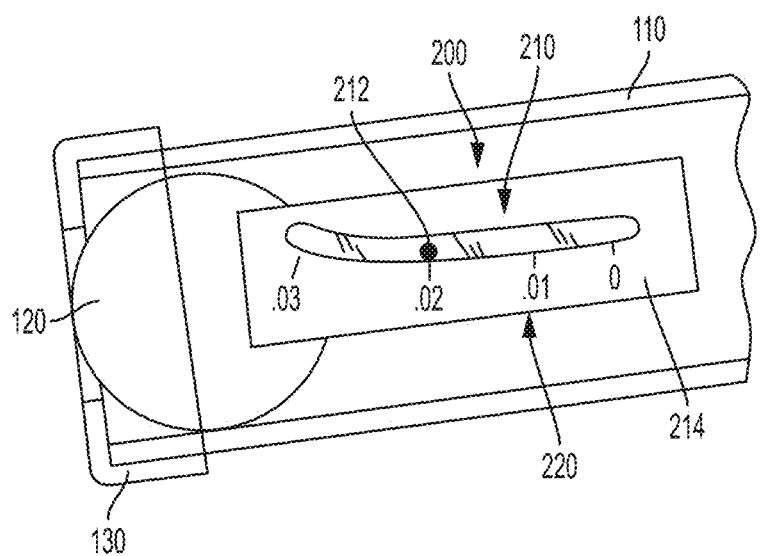
FIG. 9 is a partial cross-sectional view of a different device for detecting a differential pressure in accordance with some embodiments.

FIGS. 8-9 show devices that include ball-type differential pressure set point indicators where the differential pressure set point indicator 200 includes a vial 210 with a ball pointer 212. The vial 210 is filled with a fluid (e.g., gas, liquid) and the ball pointer moves to the lowest point within the vial by force of gravity. The vial 210 may exhibit a curvature that permits the ball to provide information regarding the angle of incline of the conduit when the ball 212 remains in steady alignment at various regions along the vial. For instance, when the conduit is perfectly level, the ball pointer 212 moves toward the middle of the vial. Though, when the conduit is tilted at an angle, the ball pointer 212 may still remain in steady alignment with a region of the vial that is offset from the middle of the vial.

Markings 220 are provided adjacent to the vial so that appropriate information can be provided when the conduit is tilted such that the ball pointer 212 steadily aligns with a particular set of the markings. The markings 220 refer to the threshold differential pressure set point between rooms required to create a sufficient degree of air flow that moves the ball 120 within the lumen of the conduit 110 from the lower end of the conduit to the higher end. That is, the conduit 110 may be tilted so that the ball pointer 212 aligns with markings that indicate a particular value of directional pressure differential. When the conduit is installed at the angle that corresponds to that particular value of directional pressure differential, movement of the ball 120 within the lumen from the lower end of the conduit to the higher end of the conduit may provide assurance to an observer that the directional differential pressure indicated by the ball pointer 212, at a minimum, actually exists between the rooms.

FIGS. 8 and 9 are various embodiments of ball-type differential pressure set point indicators 200 where the shape of the vial differs. Depending on how the vial of a ball-type differential pressure set point indicator is shaped, the markings 220 which relate the angle of incline of the conduit to the threshold pressure differential(s) between rooms will be calibrated and appropriately positioned.

The ball-type differential pressure set point indicator of FIG. 8 provides for different threshold differential pressure set points. Since the differential pressure set point indicator can sense both directions of the conduit incline, there are two similar symmetric markings for each desired threshold differential pressure set point. The ball-type differential pressure set point indicator of FIG. 9 provides for threshold differential pressure information for tilt of the conduit in only one direction. and so the markings are uni-directional rather than bi-directional as in FIGS. 5-8. In some embodiments, the ball-type differential pressure set point indicator of FIG. 9 as compared to those in FIGS. 5-8, provides for a finer degree of set point adjustment for indicating whether the threshold differential pressure between rooms is present.

Figure 10:
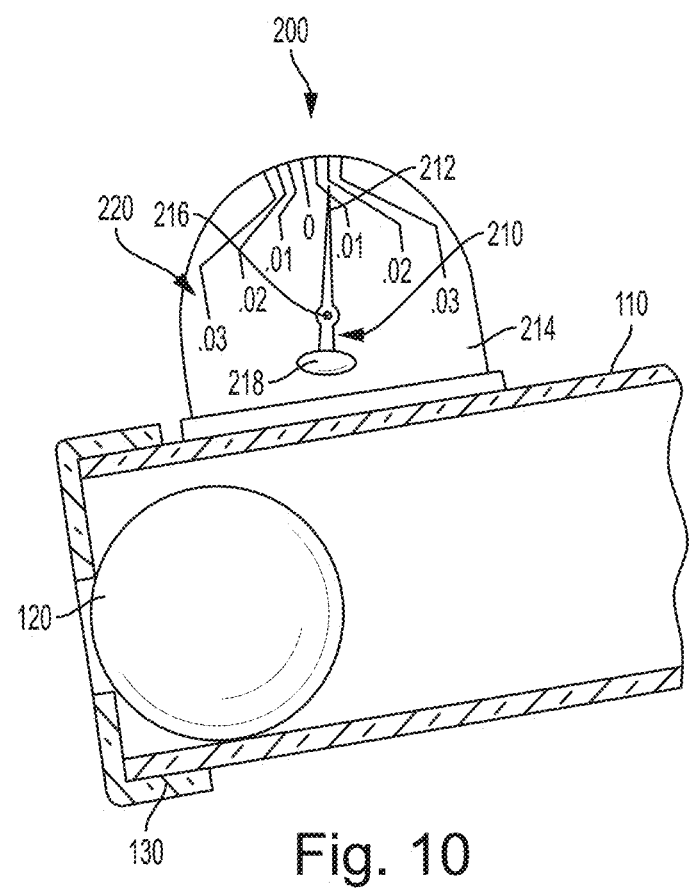
FIG. 10 is a partial cross-sectional view of another device for detecting a differential pressure in accordance with some embodiments.

In the embodiment of FIG. 10, the device 10 includes a differential pressure set point indicator 200 having a weighted pointer 210. As shown, the differential pressure set point indicator 200 is rigidly secured to the outer surface of the conduit 10 via base plate 214. The differential pressure set point indicator 200 includes a tip pointer 212 that is pivotally connected to the base plate 214. A weight 218 is provided at an end opposite the tip pointer below the pivot point 216. When the conduit 110 is placed within a wall at an angle of inclination with respect to the horizontal, the tip pointer 212 will vary in its position and pivot to reflect the degree to which the conduit is tilted with respect to the horizontal.

The tip pointer is further adapted to rotate about the pivot point so as to point to the bi-directional reference markings 220, which are calibrated to match the angle of incline with the threshold differential pressure between opposite ends of the conduit 10 at which the ball 120 will be urged against the force of gravity to move from the lower end toward the opposite higher end of the conduit. As such, depending on the angle of incline of the conduit, the tip pointer will come into steady alignment with reference markings 220 that are calibrated to represent minimum differential pressures required to move and maintain the ball 120 at a desired position within the conduit, for instance, at the highest point.

Figure 11:
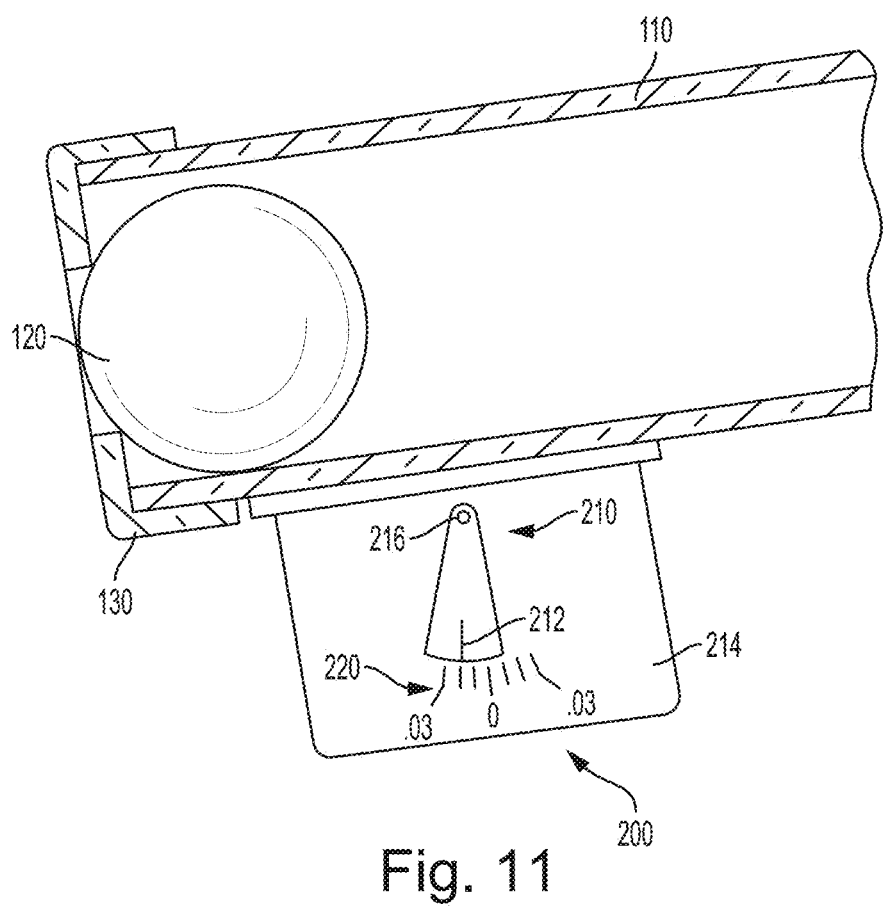
FIG. 11 is a partial cross-sectional view of a further device for detecting a differential pressure in accordance with some embodiments.

FIG. 11 shows a device 10 that includes a pendulum differential pressure set point indicator 200. The differential pressure set point indicator 200 is rigidly secured to the outer surface of the conduit 10 via base plate 214. The differential pressure set point indicator 200 includes a pendulum pointer 212 that is pivotally connected to the base plate 214 at a point 216. Here, the pendulum pointer 212 extends downwardly and rotates about the pivot point 216 so as to point to the bi-directional reference markings 220 which are calibrated similarly to that described above regarding FIG. 10.

Thus, given a desired minimum differential pressure between enclosed spaces that are separated by a wall through which the conduit extends, appropriately calibrated differential pressure set point indicators with accurate markings may allow the angle of inclination of the conduit according to the present disclosure to be easily adjusted to suit the desired directional pressure differential. That is, the conduit of a device installed into a wall separating two enclosed spaces may be oriented at a particular angle that corresponds to a threshold differential pressure between the separate spaces sufficient to cause a ball, or other movable element, disposed within the conduit to move from the lower end to the higher end of the conduit. When it is desired for that threshold differential pressure between the separate enclosed spaces to be altered, the differential pressure set point indicator, with appropriately calibrated reference markings, may be used as an easy reference to determine what the adjusted angle of the conduit should be to correspond to the new threshold pressure differential.

Such an adjustment of the angle of the conduit may be a relatively simple procedure. For instance, in an embodiment described, fasteners attaching respective outer wall flanges 160 to inner wall flanges 150 of the device may be loosened and the outer wall flanges, which provide support for the conduit, may be shifted vertically with respect to the inner wall flanges so as to suitably alter the angle of incline of the conduit. An appropriately calibrated differential pressure set point indicator may be used as a reference to determine what angle of incline to which the conduit should be set so as to correspond to the desired threshold differential pressure between opposite ends of the conduit. Once the conduit is oriented in accordance with the appropriate angle of incline, the fasteners of respective outer wall flanges are then tightened to set the conduit firmly in place. Respective gaskets secured to the outer wall flanges may assist in holding the conduit securely at the desired orientation.

Suitable adjustments of the angle of incline of the conduit may be performed manually or automatically. For example, an operator may use the above procedure to adjust the angle of incline of the conduit manually.

Or, the device may be set up in accordance with an automated system that is configured to adjust orientation of the conduit automatically depending on the desired level of differential pressure between spaces on opposite sides of the wall. In some embodiments, the device may be configured with a control system that automatically adjusts the angle of incline of the conduit according to input provided by a user, or related computer system, of a desired differential pressure to be established between neighboring spaces. For example, a user may simply input the minimum differential pressure that is required between two rooms into a user interface and the system may automatically, without further user interaction, adjust the angle of incline of the conduit to correspond to the desired minimum differential pressure between rooms. In some cases, the control system may refer to the differential pressure set point indicator by any suitable detection method, to determine the appropriate angle of incline of the conduit.

As discussed, physical features other than the incline of the conduit may provide an indication of whether the directional differential pressure between spaces meets a certain threshold.

For instance, the type of ball placed within the lumen of the conduit may be chosen based on particular characteristics, such as weight or surface finish of the ball. That is, a greater differential pressure will be required to move a heavier ball from a lower region of the conduit to a higher region of the conduit. Conversely, if the ball is lighter, a smaller differential pressure will be required to move the ball toward the higher end of the conduit. Alternatively, a ball having a rough surface finish may require a greater degree of air flow provided through differential pressure to move the ball toward the higher end of the conduit. Accordingly, different balls, or movable elements, may be marked according to the range of differential pressure that the detector, incorporating the particular ball(s), may indicate.

Alternatively, the type of stops at the ends of the conduit may be chosen according to the particular range of directional differential pressure(s) to be detected. For example, for a given ball within the conduit, an end stop having a small orifice that limits the rate of air flow through the conduit may be used as an indicator for the differential pressure between the spaces. That is, where end stops of a detector have relatively small openings such that the rate of air flow through the openings is limited, a greater differential pressure will be required to move a ball from a lower region of the conduit to a higher region of the conduit. Conversely, if the openings are wider, allowing a greater flow rate of air through the conduit, a smaller differential pressure may be required to move the movable element toward the higher end of the conduit. As a result, different end stops having different orifice sizes may be marked according to the range of differential pressure that the detector incorporating the particular end stop(s), may indicate.

Thus, different components of the differential pressure detector may be marked so as to provide an indication of the minimum differential pressure threshold that would cause the movable element to move from a lower end region toward a higher opposite end region of the conduit. Markings of the ball, conduit, end stops of the conduit, etc. may refer to actual units of pressure indicating the directional threshold pressure differential set point between rooms; such markings may be alphanumeric values to which a correlating table may be referred; alternatively, the markings may provide an actual property (e.g., ball weight, end stop orifice size, conduit curvature, conduit/ball surface finish, etc.) to which a correlating table may be referred, to determine the corresponding directional threshold differential pressure set point.

A differential pressure set point indicator may be secured to any portion of a device using any suitable manner. In some embodiments, differential pressure set point indicators are secured to a device (e.g., on the outer surface of the conduit) by an appropriate adhesive or fastener. Or, as discussed below, an appropriate holder may be used to mount the differential pressure set point indicator.

Figure 12:
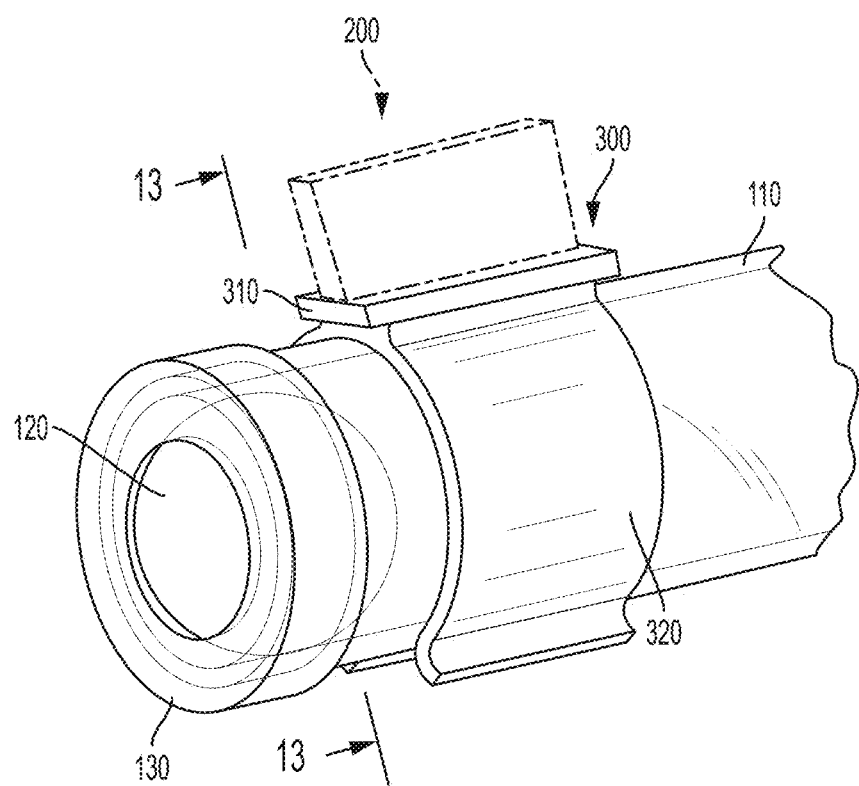
FIG. 12 is a partial perspective view of a holder used with a device for detecting a differential pressure in accordance with some embodiments.
Figure 13:
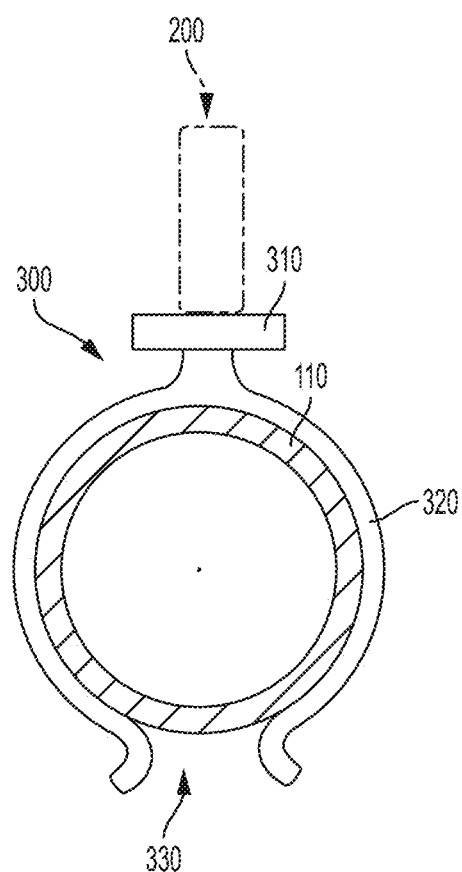
FIG. 13 is a cross-sectional view of the holder used with the device of FIG. 12.

FIGS. 12 and 13 show an embodiment of a holder 300 for mounting the differential pressure set point indicator 200 on to the conduit 110. The holder 300 includes a plate 310 to which a surface of a differential pressure set point indicator may be attached. The holder 300 further includes an elastically deformable spring clip 320 that wraps around the exterior of the conduit 110. In some embodiments, the spring clip 320 has an opening 330 with ends that may be spread apart so that the conduit 110 may be suitably secured within the clip 320. As an alternative, a split ring divided at one or more locations along the ring, capable of fastening tight about the perimeter of the conduit may be used to mount the differential pressure set point indicator.

In another aspect of the present disclosure, it may be desirable for noise to be attenuated upon impact of the ball, or other movable element, against either end stop that is useful for keeping the movable element contained within the conduit. For instance, the ball and end stops of the device may be made of materials that produce a noticeable sound when the ball drops on to an end stop at the lower position or when the ball is pushed up against the end stop at the higher position. For example, a ping pong ball makes a distinct noise upon impact with a relatively rigid surface. In some cases, such a sound may be irritating to people that may be located within either of the rooms that share the device. Thus, a sound attenuator or device may be included for substantially reducing noise when the ball moves from one end of the conduit to the opposite end and is subject to impact.

The sound attenuator may include any suitable material or combination of materials. In some embodiments, the sound attenuator may include a relatively soft energy absorbing material, such as an elastomer, rubber, neoprene, silicone, plastic, polymer, foam, fibrous material, paper, tissue, netting, etc. In some embodiments, the sound attenuator may exhibit a geometry that cushions the impact of the movable element on a stop.

In some embodiments, a sound attenuator separate from the end stops is fitted with the end stop(s) of the conduit, as shown by way of example, in FIGS. 14-16 and 18A-18B. In other embodiments, the end stop(s) include an energy absorbing material which is sound attenuating and, hence, comprise the sound attenuator, for example, shown in FIG. 17.

Figure 14:
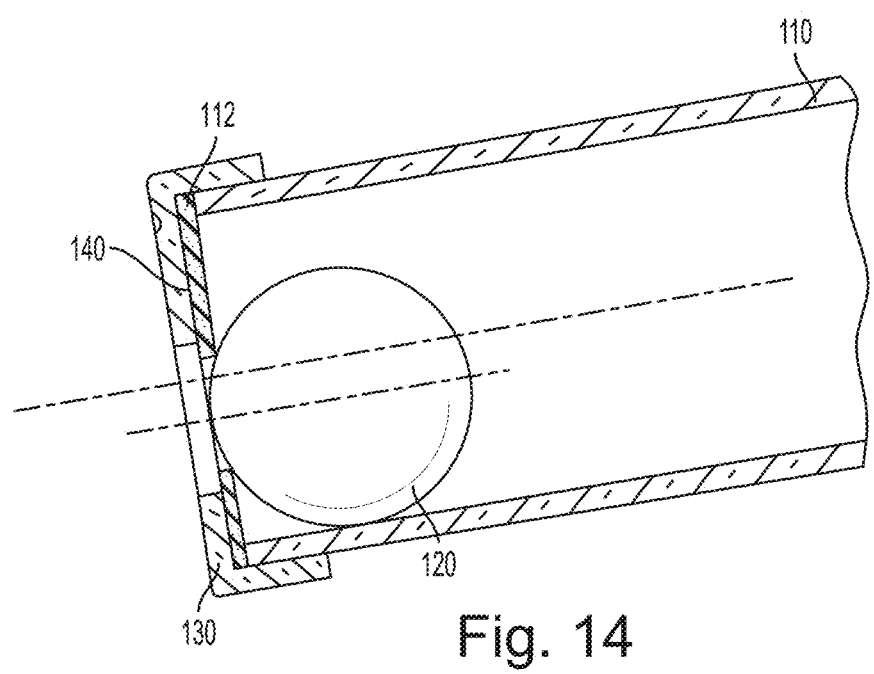
FIG. 14 is a partial cross-sectional view of a sound attenuator used with a device for detecting a differential pressure in accordance with some embodiments.
Figure 15:
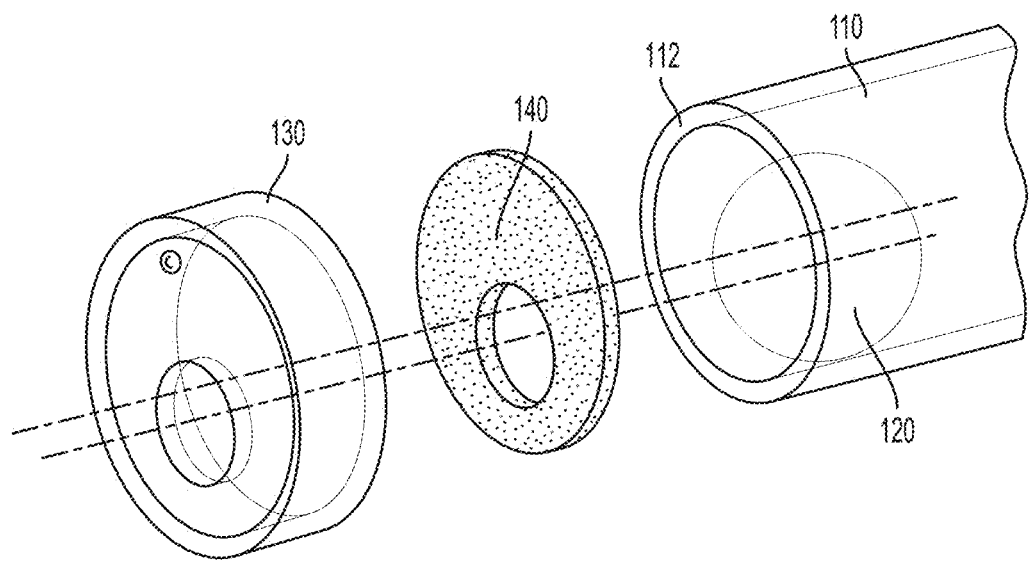
FIG. 15 is a partial exploded view of the sound attenuator used with the device for detecting a differential pressure of FIG. 14.

FIGS. 14-15 show conduit 110 with an end stop 130 that forms a suitable fit (e.g., interference fit, snap fit) over an edge 112 of the conduit. Positioned between the edge 112 of the conduit and the end stop 130 is a sound attenuator 140. In this embodiment, the ball 120 is a ping pong ball and the end stop 130 is made of a hard plastic. Thus, without appropriate placement of the sound attenuator 140 between the conduit and the end stop, when the ball impacts against the end stop 130, an abrupt sound is produced which can be easily heard by a person located in the room where the impact occurs, and possibly in an adjacent room where the other open end of the conduit resides. When the sound attenuator 140 is appropriately placed between the conduit and the end stop, impact of the ball against the sound attenuator 140 will produce a much softer sound which is not as readily noticeable as compared with the sound produced when the energy absorbing material is not present.

Figure 16:
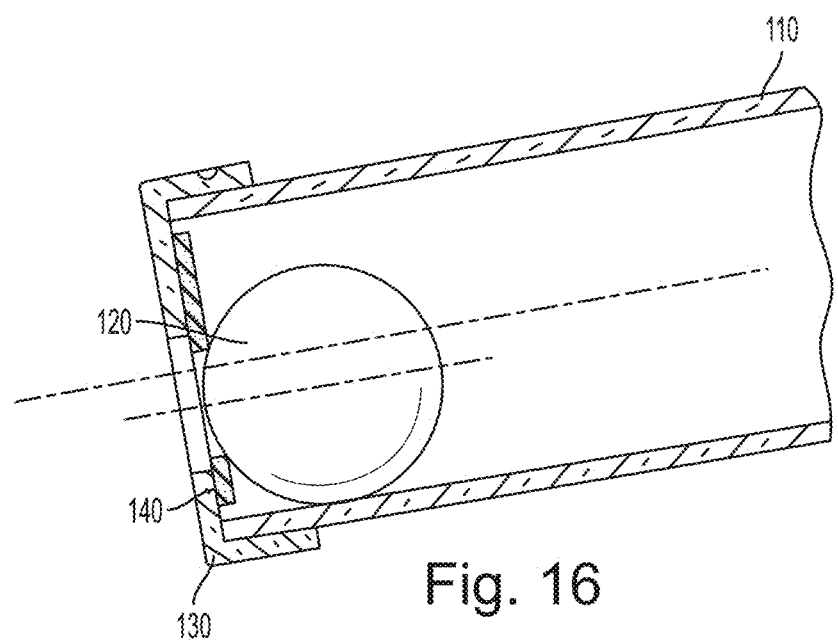
FIG. 16 is a partial cross-sectional view of another sound attenuator used with a device for detecting a differential pressure in accordance with some embodiments.

FIG. 16 depicts another embodiment of an end stop 130 associated with a sound attenuator 140. Here, the sound attenuator 140 is attached (e.g., adhered) to the inside surface of the end stop. The sound attenuator is made of a material that is shaped in a geometry that absorbs impact energy. Accordingly, when the ball impacts the sound attenuator 140, a relatively soft sound is produced as compared to instances where the energy absorbing material in an energy absorbing geometry is not present.

As shown in FIGS. 14-16, the center axis of the opening of the sound attenuator 140 and the opening of the end stop 130 is offset from the center axis of the conduit, as depicted by the offset axes in each figure, yet is substantially aligned with the center axis along which the ball moves. Such alignment of the opening of the sound attenuator with the center of the ball is more effective for lessening the amount of sound generated upon impact at the end(s) of the conduit than would otherwise be the case without the alignment. Additionally, alignment of the opening of the end stop is also effective for directing air flow generated by the differential pressure toward the ball, rather than allowing leakage of air flow around the ball, which could potentially give rise to inaccuracies in overall differential pressure indication by the device. This alignment also may contribute to closing off the end stop or sound attenuator hole with the ball (e.g., forming a seal) and limiting the transfer of air between rooms whenever the ball abuts the end stop or sound attenuator.

Figure 17:
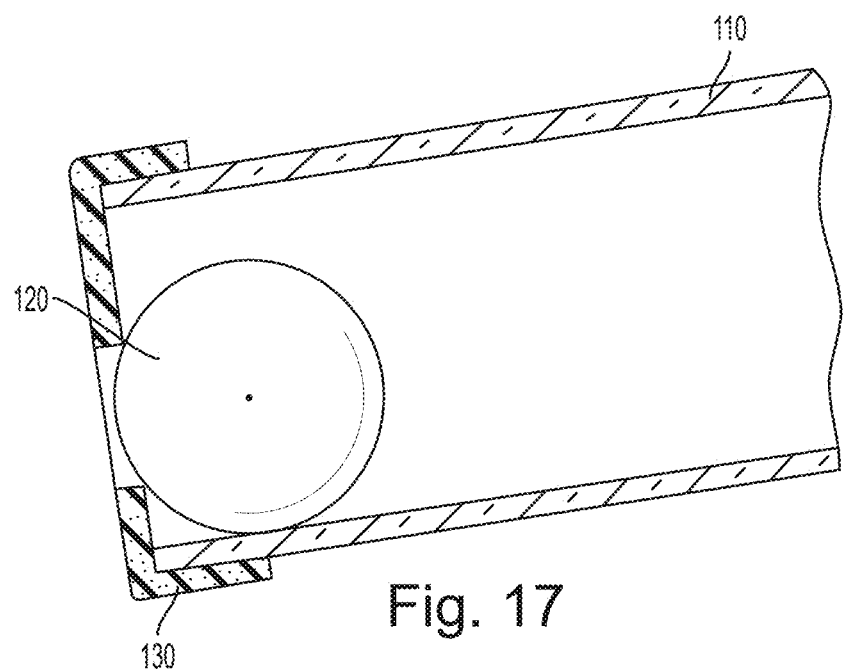
FIG. 17 is a partial cross-sectional view of yet another sound attenuator used with a device for detecting a differential pressure in accordance with some embodiments.

In some embodiments, the end stop itself is sound attenuating. As shown in FIG. 17, the end stop 130 includes an energy absorbing material. In some embodiments, the end stop may exhibit a geometry similar to a diaphragm. As a result, a softer sound is produced when the ball impacts the sound attenuating end stop as compared to an arrangement where the end stop was made of a relatively hard plastic.

Figure 18A:
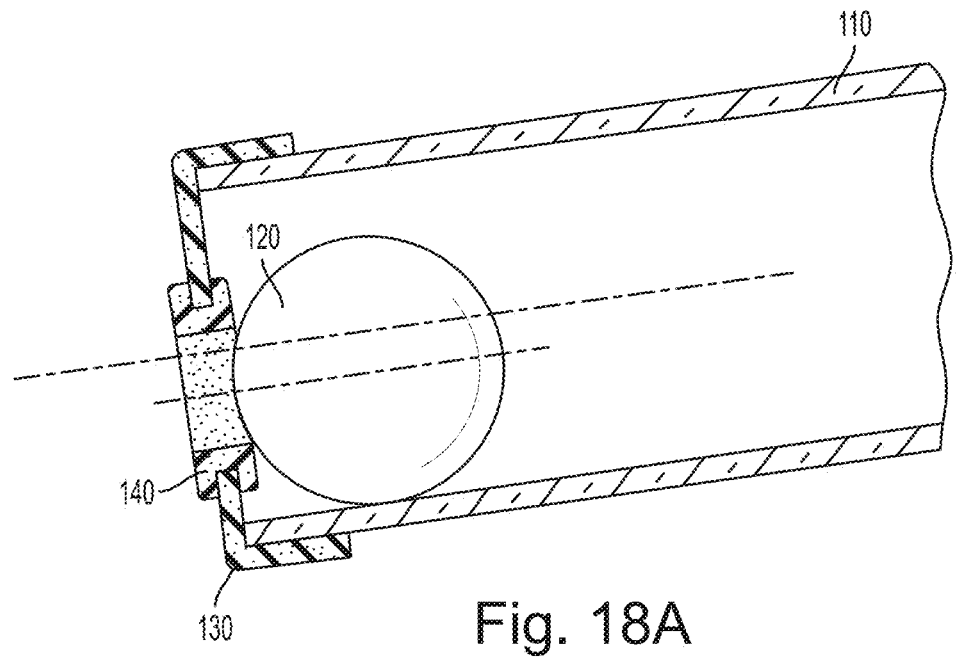
FIG. 18A is a partial cross-sectional view of another sound attenuator used with a device for detecting a differential pressure in accordance with some embodiments.
Figure 18B:
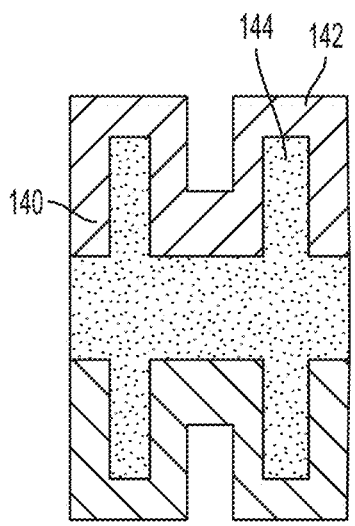
FIG. 18B is a cross-sectional view of another sound attenuator in accordance with some embodiments.

FIG. 18A shows a device where a sound attenuator 140 (e.g., grommet) is fitted at the opening of the end stop 130. The sound attenuator may attenuate sound that would otherwise be produced upon impact of the ball against the end stop of the conduit. In some embodiments, the sound attenuator is flexible so as to be removable from the opening of the end stop and subsequently replaced. In some embodiments, as shown in FIG. 18B, the sound attenuator includes a flexible flap 142 surrounding a space 144 that includes air and/or a soft material that absorbs the impact of the ball. In other embodiments, the sound attenuator is integrally formed with or permanently attached to the end stop.

Figure 19:
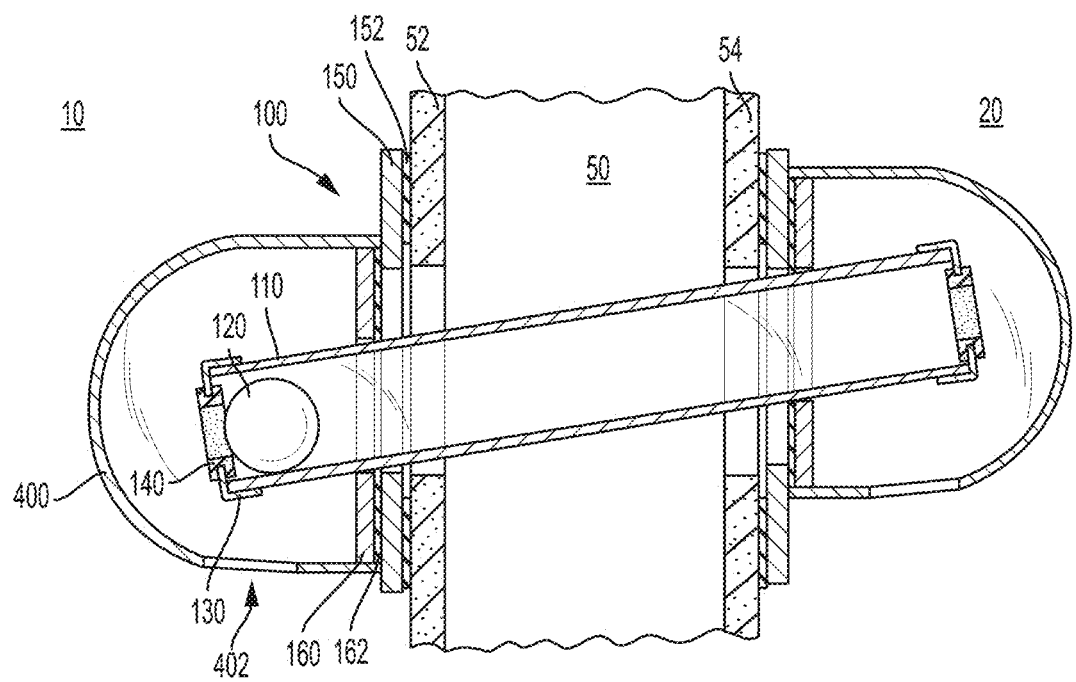
FIG. 19 is a cross-sectional view of a device for detecting a differential pressure in accordance with some embodiments.

FIG. 19 shows a device 100 in an installed configuration where the conduit is positioned at an angle with respect to the horizontal. The ball 120 rests against a replaceable sound attenuator 140, provided as a grommet which is, in turn, coupled to the end stop 130. The device further includes protective coverings 400 surrounding each end of the conduit. The protective coverings 400 include openings 402 through which fluid (e.g., air, gas) may flow from one room 10, through the conduit, and to the room 20 on the other side of the wall. The protective coverings 400 are shown in this embodiment to fit over the wall flange 160 and the associated sealing material 162 in a secured manner, with the edge of the coverings being in contact with the wall flange 150.

Protective coverings may be useful to shield the openings of the conduit, or the ball itself, from contamination or sudden rushes of air that may affect positioning of the ball within the conduit (e.g., a rush of air that occurs when a door between rooms is opened, equalizing the pressure difference between rooms, or when a window is opened). Such coverings also may discourage people from playing with or inappropriately manipulating various parts of the device, which could lead to damage to the device. For instance, absent the protective coverings, a person might be more likely to pull the end stop off of a conduit or inappropriately grasp the conduit as compared to if the ends are surrounding by the protective coverings. Thus, protective coverings may provide shielding for components of the device as well as deter people from potentially rendering the device non-functional.

To allow observers to view whether the ball is present at a particular end or other region of the conduit, protective coverings may be transparent, or substantially see-through.

Figure 20:
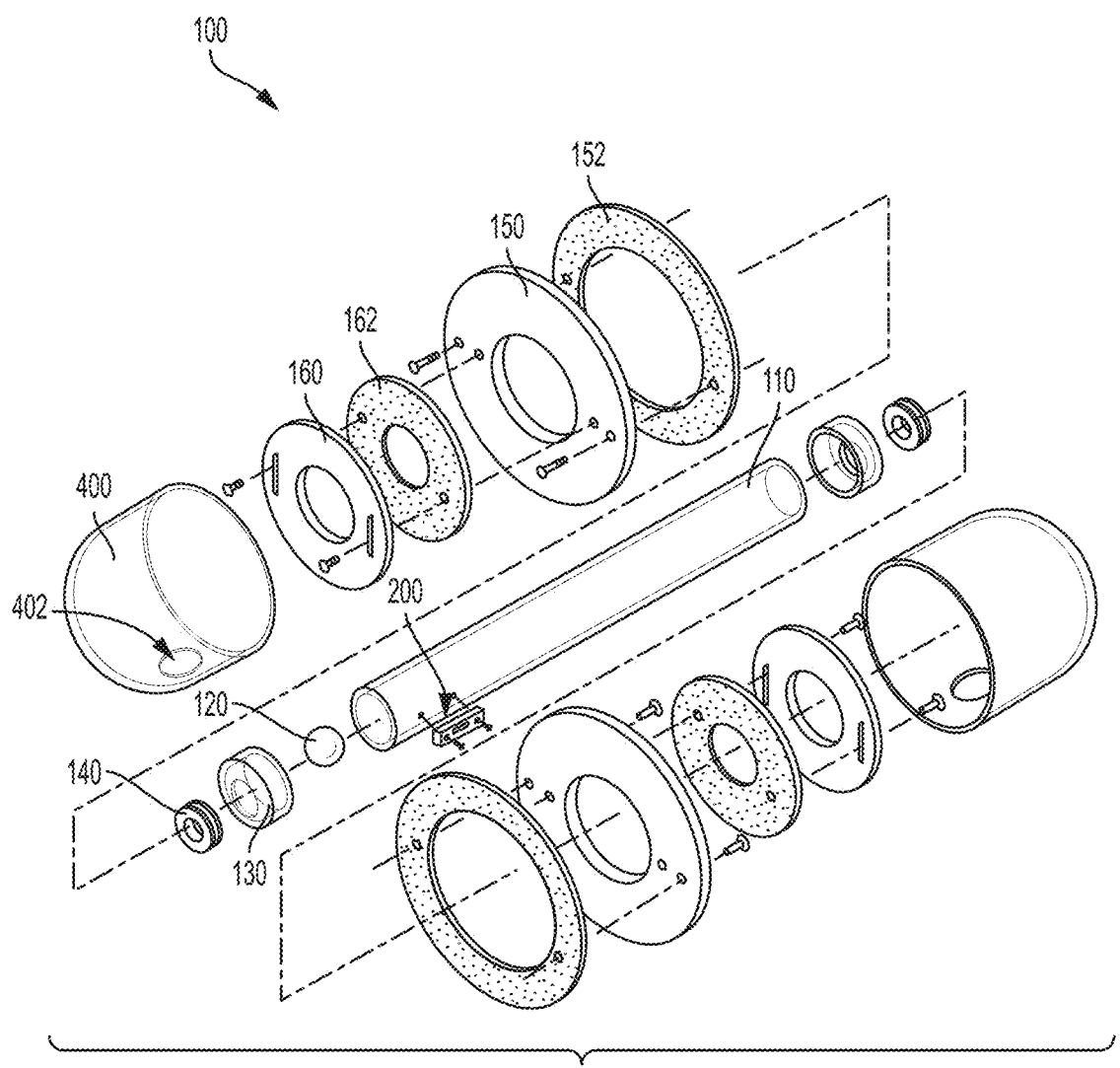
FIG. 20 is an exploded view of the device of FIG. 19.

FIG. 20 shows an exploded view of the device 100. As shown, the protective covering 400 fits over the outer wall flange 160 and sealing material 162. The outer wall flange 160 and outer sealing material 162 are attached to an inner wall flange 150 via a suitable set of fasteners. As discussed previously, the vertical position of a fastener for the outer wall flange 160 may be adjustable to suit the desired angle of incline of the conduit 110. The inner wall flange 150, in turn, is attached to the inner sealing material 152 and the exterior surface of the wall (not shown in this figure) via another set of fasteners.

Referring to the conduit 110, the differential pressure set point indicator 200 is attached to the exterior surface of the conduit. The ball 120 is disposed within the lumen of the conduit and the ends of the conduit are fitted with end stops 130 that prevent the ball from exiting the conduit while, at the same time, having openings 132 on opposite ends that allow fluid to flow through the length of the conduit. Sound attenuating grommets 140 are placed within respective openings 132 of the end stops so that the ball does not make a substantially noticeable noise upon impact with the end of the conduit.

In some embodiments, the sealing material 162 has an opening that has a diameter slightly smaller than the outer diameter of the conduit. Accordingly, the sealing material 162 may form a snug seal with the exterior surface of the conduit, preventing fluid from flowing through the opening of the wall flange 160, except through the lumen of the conduit. The diameter of the sealing material 162 is also slightly smaller than the opening diameter of the wall flange 160 so as to accommodate various orientations of the angled conduit within the opening of the wall flange 160.

Figure 21:
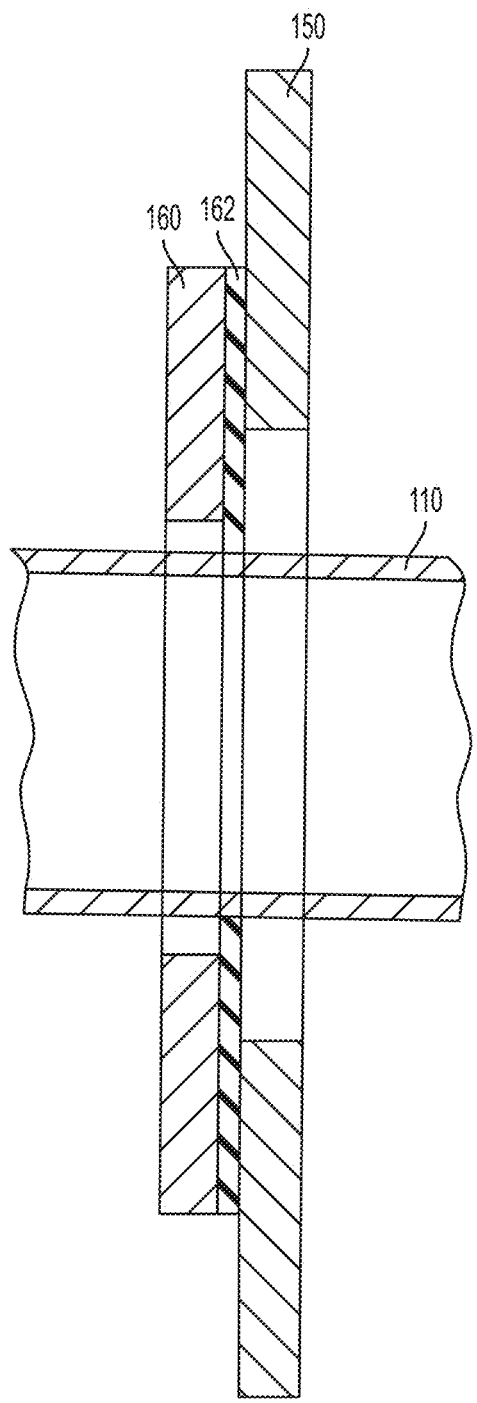
FIG. 21 is a partial cross-sectional view of a support used with a device for detecting a differential pressure in accordance with some embodiments.

As shown in FIG. 21, when the device is installed, the sealing material 162 is in contact with the exterior surface of the conduit so as to form a seal between the surface of the wall (via the wall flanges) and the conduit. The opening of the wall flange 160 may also provide vertical tolerance for the position of the conduit to be adjusted (e.g., adjusting the angle of inclination of the conduit).

Figure 22:
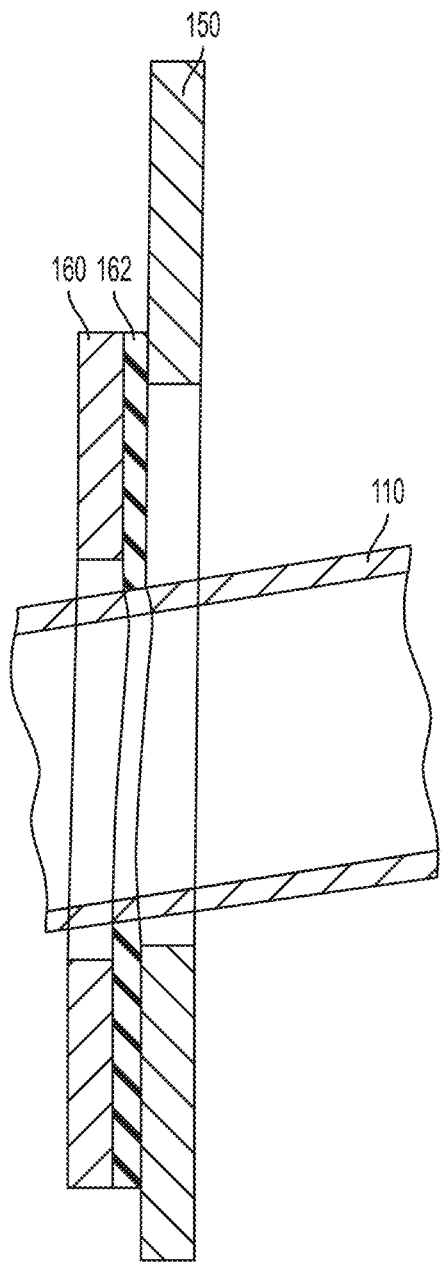
FIG. 22 is a partial cross-sectional view of the support used with the device of FIG. 21 in a tilted orientation.

The sealing material may be a gasket that is flexibly deformable. Such a characteristic allows for the sealing material to accommodate adjustments in position of the conduit, while also maintaining the seal between the surface of the wall and the conduit. For example, as shown in FIG. 22, while the conduit may be positioned at a particular angle of inclination, the seal remains unbroken. Further, the sealing material 162 may be composed of a composition that also provides an appropriate degree of support for the conduit while placed in the angled position.

The sealing material may comprise any suitable composition that is flexible, yet is appropriate for maintaining a seal. In some embodiments, the sealing material includes at least one of an elastomer, rubber, silicone, any other suitable composition and/or combinations thereof.

While FIG. 22 shows how the sealing material distorts upon adjustment of the conduit into an angled orientation, the sealing material 162 not only maintains the seal so as to prevent fluid flow from one side of the wall to the other over the exterior of the conduit, but also provides support for the conduit in the angled orientation. That is, the sealing material 162 may function as a gasket that substantially holds the conduit at the angled orientation. Accordingly, the sealing material mitigates the occurrence of creep of the conduit from its set angled orientation, reducing potential inaccuracies in the overall indication(s) of differential pressure between rooms within which opposite ends of the conduit are present.

In some embodiments, the device includes features that are adjustable in length so as to accommodate installation of the device into different walls of varying thickness.

Figure 23:
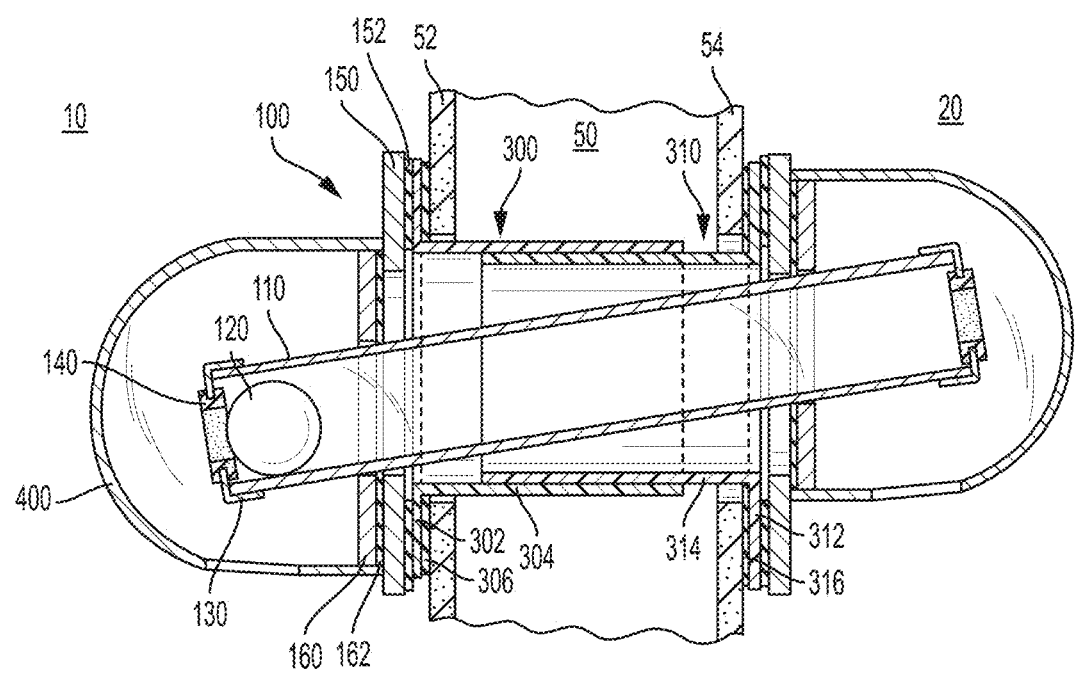
FIG. 23 is a cross-sectional view of another device for detecting a differential pressure in accordance with some embodiments.
Figure 24:
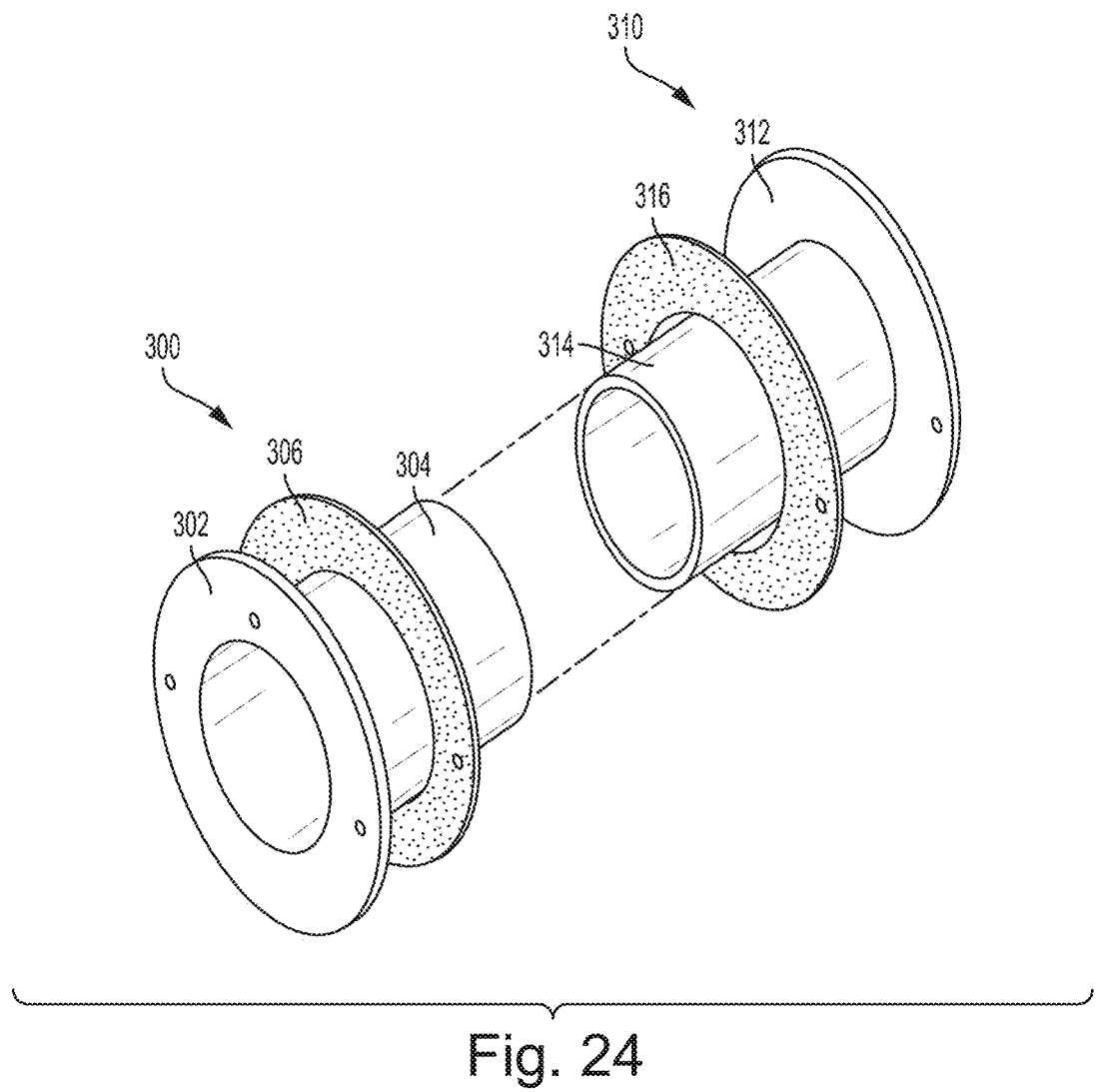
FIG. 24 is a perspective view of an adjustable portion of a device for detecting a differential pressure in accordance with some embodiments.

The embodiment illustrated in FIGS. 23-24 includes the device installed with telescoping wall cavity barriers 300, 310. Here, the wall flanges 150 and associated sealing materials 152 are attached to respective wall cavity barriers 300, 310, which are, in turn, attached to the exterior surfaces of the walls 52, 54. As shown in FIG. 23, when installed, the wall cavity barriers 300, 310 define a space within which the conduit 110 is housed, providing an additional degree of protection for the conduit within the wall. In some embodiments, wall cavity barriers provide protection for the conduit from any contaminants within the wall cavity 50 outside the lumen of the wall tubes 304, 305 from transmission into either of the rooms 10, 20 or conversely, any contaminants from either room 10, 20 from entering into the wall cavity outside the lumen of the wall tubes 304, 305.

As depicted in FIG. 24, the wall cavity barriers 300, 310 may include respective wall plates 302, 312, wall tubes 304, 314 and sealing materials 306, 316. The wall plates 302, 312 provide for attachment of the device to the wall during installation. That is, the wall plates may be attached (e.g., via fasteners, adhesives, etc.) on opposite sides of the wall to surfaces 52, 54 so that the wall tubes 304, 314 may extend into the wall and provide protection and support for the angled conduit. Sealing materials 306, 316 may protect transmission of air between rooms 10, 20 and the wall cavity 50.

The wall tubes 304, 314 operatively engage with one another, as shown in FIG. 23, so as to provide a housing for the conduit. For example, the wall tubes may be telescoping or otherwise slidable with respect to one another so that the wall cavity barrier may be appropriately installed in walls having different thicknesses. In some embodiments, the wall tubes may include features, such as spring-loaded protrusions along the length of one tube and corresponding holes along the length of another tube that allow the overall length housed by the wall tubes to be fixedly adjustable. Or, the wall tubes may include appropriate interference/snap fit features that provide length adjustability of the tubes with respect to one another. Alternatively, the wall tubes may be removably attached to each other via a suitable fastener and/or adhesive material. Telescoping tube arrangements may be of a sufficient interface fit so as to prevent transmission of contaminated or unwanted air between the wall cavity 50 and the lumen of the wall tubes 304, 314.

As shown in FIGS. 23-24, the sealing materials 306, 316 may have openings for respective wall tubes 304, 314 so that a seal is formed between the exterior surfaces of the wall 52, 54 and the wall plates 302, 312.

Figure 25:
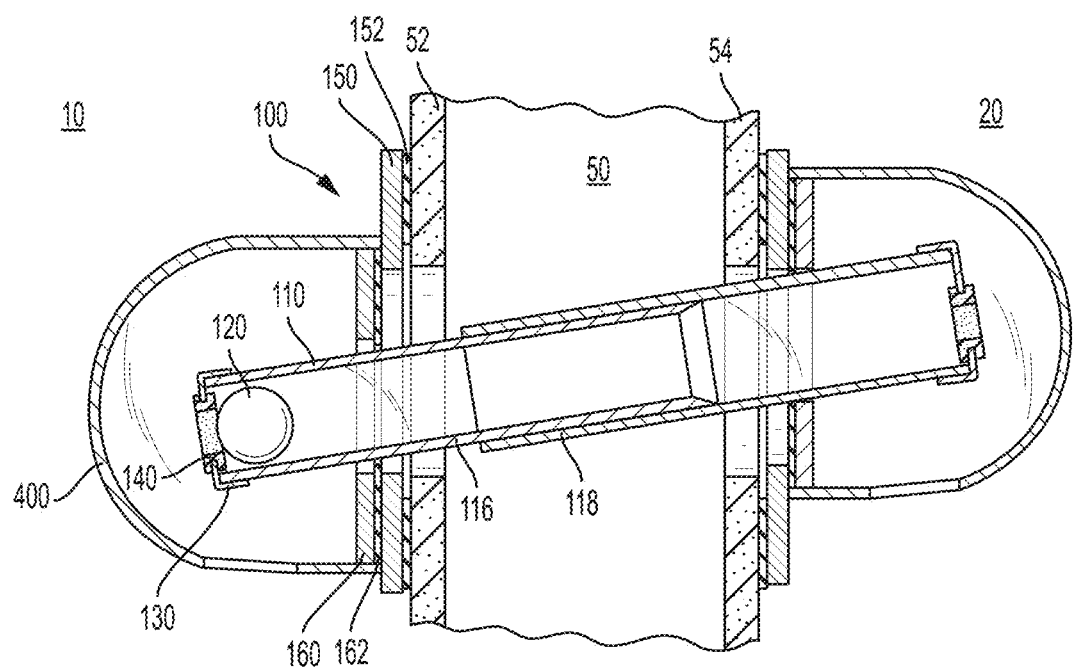
FIG. 25 is a cross-sectional view of a different device for detecting a differential pressure in accordance with some embodiments.
Figure 26:
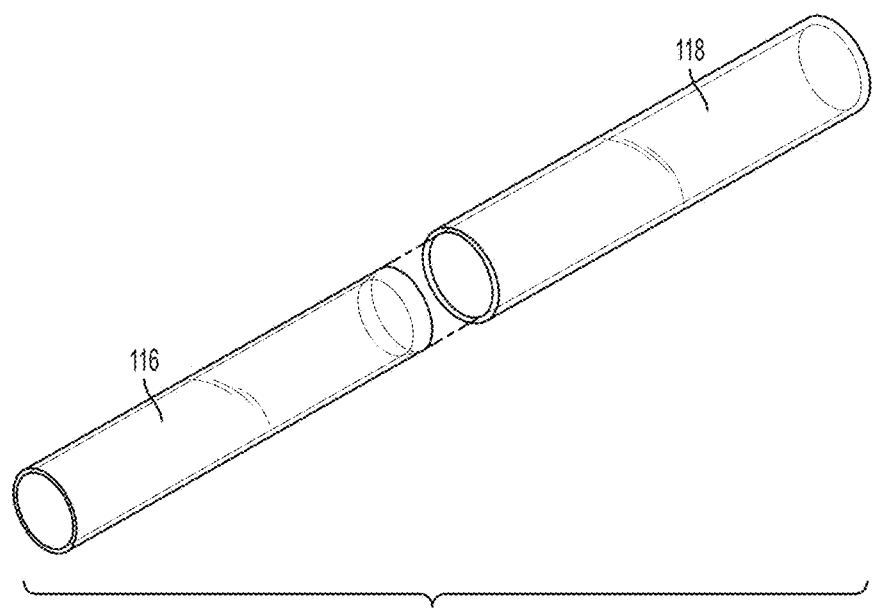
FIG. 26 is a perspective view of another adjustable portion of a device for detecting a differential pressure in accordance with some embodiments.

In some embodiments, the conduit itself may be adjustable in length. FIGS. 25-26 depict a telescoping conduit. In this embodiment, the conduit includes a first portion 116 and a second portion 118 that are operatively engaged with one another so as to provide for length adjustability of the conduit. For instance, the first and second portions of the conduit are configured to be telescoping or otherwise slidable with respect to one another. As a result, the device may be installed into different walls having varying thickness.

Similar to the wall tubes discussed above, the first and second portions of the conduit may include features that allow the length of the conduit to be appropriately adjusted. For example, such portions may include spring-loaded protrusions along the length of one portion and corresponding holes along the length of the other portion so that the overall length of the conduit is fixedly adjustable. Or, the conduit portions may have appropriate interference/snap fit features that provide length adjustability of the conduit. In some embodiments, the respective portions of the conduit may be removably attached to each other via a suitable fastener and/or adhesive material.

Having thus described several aspects of at least one embodiment of this invention, it is to be appreciated various alterations, modifications, and improvements will readily occur to those skilled in the art. Such alterations, modification, and improvements are intended to be part of this disclosure, and are intended to be within the spirit and scope of the invention. Accordingly, the foregoing description and drawings are by way of example only.

What is claimed is:

1. A device for detecting directional differential pressure between two spaces, comprising:
    an elongated conduit arranged to be coupled with a wall separating a first space from a second space, the conduit having openings that permit fluid flow through the conduit from the first space to the second space, the conduit arranged to be inclined with respect to a horizontal reference plane such that a first region of the conduit is vertically lower than a second, vertically higher region of the conduit; and
    a plurality of movable elements, each movable element having a different weight from the others of the plurality of movable elements, and each movable element being configured to be placed in the conduit, and each movable element corresponding to a different threshold differential pressure set point, the threshold differential pressure set point representing a differential pressure between the first and second spaces that is sufficient to cause the movable element disposed within the conduit to move from the first, vertically lower region of the conduit to the second, vertically higher region; wherein
    each movable element is adapted to provide a set point indication of the threshold differential pressure set point to which the movable element corresponds.

2. A device as in claim 1, wherein each of the plurality of movable elements is a ball.

3. A device as in claim 1, wherein the plurality of movable elements each include a marking that indicates the respective threshold differential pressure set point.

4. A device as in claim 3, wherein:
    each of the plurality of movable elements is a ball; and
    the marking on each ball includes a unit of pressure.

5. A device as in claim 3, further comprising a table listing threshold differential pressure set points; wherein:
    each of the plurality of movable elements is a ball; and
    the marking on each ball includes an alphanumeric value which the table references.

6. A device as in claim 1, wherein the conduit is adjustable in length.

7. A device as in claim 6, wherein the conduit comprises a first portion and a second portion operatively engaged with one another to provide for length adjustability of the conduit.

8. A device as in claim 7, wherein the first and second portions of the conduit are configured to be telescoping with respect to one another.

9. A device as in claim 1, wherein the conduit has a first end arranged to be positioned within the first space, and the conduit has a second end arranged to be positioned within the second space.

10. A device as in claim 1, wherein the first region of the conduit is arranged to be positioned in the first space.

11. A device as in claim 10, wherein the second region of the conduit is arranged to be positioned in the second space.

12. A device as in claim 11, wherein the conduit openings are positioned at opposite ends of the conduit.

13. A device as in claim 1, wherein the conduit is transparent or translucent.

14. A device for detecting directional differential pressure between two spaces, comprising:
    an elongated conduit arranged to be coupled with a wall separating a first space from a second space, the conduit having openings that permit fluid flow through the conduit from the first space to the second space, the conduit arranged to be inclined with respect to a horizontal reference plane such that a first region of the conduit is vertically lower than a second, vertically higher region of the conduit; and
    a plurality of movable elements, each movable element being configured to be placed in the conduit and adapted to provide a set point indication of a threshold differential pressure between the first and second spaces that is sufficient to cause the movable element, when disposed within the conduit, to move from the first, vertically lower region of the conduit to the second, vertically higher region in response to a differential pressure between the first and second spaces, wherein each movable element is adapted to provide a set point indication that is different from the set point indication that each of the other movable elements is configured to provide.

15. A device as in claim 14, wherein the first region of the conduit is arranged to be positioned in the first space.

16. A device as in claim 15, wherein each of the plurality of movable elements is a different weight than the others of the plurality of movable elements.

17. A device as in claim 16, wherein each of the plurality of movable elements is a ball.

18. A device as in claim 15, wherein the plurality of movable elements each include a marking that indicates the respective threshold differential pressure.

19. A device as in claim 18, wherein:
    each of the plurality of movable elements is a ball;
    each of the plurality of movable elements is a different weight than the others of the plurality of movable elements; and
    the marking on each ball includes a unit of pressure.

20. A device as in claim 18, further comprising a table listing threshold differential pressure set points; wherein:
    each of the plurality of movable elements is a ball; and
    the marking on each ball includes an alphanumeric value which the table references.

21. A device as in claim 15, wherein the conduit is adjustable in length.

22. A device as in claim 21, wherein the conduit comprises a first portion and a second portion operatively engaged with one another to provide for length adjustability of the conduit.

23. A device as in claim 22, wherein the first and second portions of the conduit are configured to be telescoping with respect to one another.

24. A device as in claim 14, wherein the second region of the conduit is arranged to be positioned in the second space.

25. A device as in claim 24, wherein the conduit openings are positioned at opposite ends of the conduit.

26. A device as in claim 15, wherein the conduit is transparent or translucent.

\* \* \* \* \*